United States Patent
Endoh et al.

(10) Patent No.: US 8,938,596 B2
(45) Date of Patent: Jan. 20, 2015

(54) STORAGE APPARATUS, CONTROL APPARATUS, AND STORAGE APPARATUS CONTROL METHOD

(75) Inventors: Hajime Endoh, Shizuoka (JP); Hideaki Takahashi, Yokohama (JP); Takaomi Furoku, Shizuoka (JP); Hideyuki Tanaka, Kawasaki (JP); Hajime Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 13/609,641

(22) Filed: Sep. 11, 2012

(65) Prior Publication Data

US 2013/0086345 A1 Apr. 4, 2013

(30) Foreign Application Priority Data

Sep. 29, 2011 (JP) .................................. 2011-214610

(51) Int. Cl.
G06F 12/00 (2006.01)
G06F 11/14 (2006.01)
G06F 3/06 (2006.01)

(52) U.S. Cl.
CPC .............. G06F 11/1448 (2013.01); G06F 3/06 (2013.01)
USPC ..................... 711/162; 711/165; 711/E12.103

(58) Field of Classification Search
CPC ............ G06F 11/1448; G06F 11/1458; G06F 11/1489; G06F 11/2094; G06F 3/06
USPC ............................ 711/162, 114, 165, E12.103
See application file for complete search history.

(56) References Cited

U.S. PATENT DOCUMENTS

| 7,949,828 | B2 * | 5/2011 | Kakui et al. ................... 711/114 |
| 2004/0205206 | A1 * | 10/2004 | Naik et al. ..................... 709/230 |
| 2007/0011660 | A1 * | 1/2007 | Garyali et al. ................. 717/127 |
| 2007/0282929 | A1 * | 12/2007 | Kobayashi et al. ........... 707/204 |
| 2010/0082901 | A1 | 4/2010 | Komikado et al. |

FOREIGN PATENT DOCUMENTS

| JP | 2004-280333 | 10/2004 |
| JP | 2010-86393 | 4/2010 |

OTHER PUBLICATIONS

Patent Abstracts of Japan, Publication No. 2004-280333, Published Oct. 17, 2004.
Patent Abstracts of Japan, Publication No. 2010-086393, Published Apr. 15, 2010.

* cited by examiner

*Primary Examiner* — Pierre-Michel Bataille
(74) *Attorney, Agent, or Firm* — Staas & Halsey LLP

(57) ABSTRACT

In a storage apparatus, when a received backup instruction is a backup start instruction, a control unit performs a backup process from a position indicated by an available area start pointer. When the received backup instruction is a backup end instruction, the control unit releases an allocated backup area. In addition, the control unit determines whether the released backup area is adjacent to a position indicated by an available area end pointer. If determining that the released backup are is adjacent to the position indicated by the available area end pointer, the control unit moves the available area end pointer indicating the end of an available area to the end of the released backup area.

8 Claims, 25 Drawing Sheets

FIG. 6

| AVAILABLE AREA POINTER TABLE | 171a |
|---|---|
| AVAILABLE AREA START POINTER | AVAILABLE AREA END POINTER |
| VOLUME #13 : 0xC800001 | VOLUME #11 : 0x5600000 |

FIG. 7

BACKUP AREA CONFIGURATION TABLE 172a

| CONFIGURATION NUMBER | VOLUME INFORMATION |
|---|---|
| 1 | VOLUME#11 |
| 2 | VOLUME#12 |
| 3 | VOLUME#13 |
| ⋮ | ⋮ |

FIG. 8

BACKUP TABLE 173a

| FILE NAME | COPY SOURCE INFORMATION | COPY DESTINATION INFORMATION | DATE AND TIME |
|---|---|---|---|
| aaa.dat | VOLUME#1 : 0x32001 | VOLUME#11 : 0x55000 | 20110217100000 |
| bbb.dat | VOLUME#2 : 0x35001 | VOLUME#11 : 0x80001 | 20110217110000 |
| ... | ... | ... | ... |

FIG. 9

CONTROL INFORMATION    121d

| STATUS FLAG | 2 |
|---|---|
| NEXT ADDRESS | VOLUME#11:0xDC00002 |
| SIZE | 10GB |

미국

US 8,938,596 B2

STORAGE APPARATUS, CONTROL APPARATUS, AND STORAGE APPARATUS CONTROL METHOD

CROSS-REFERENCE TO RELATED APPLICATION

This application is based upon and claims the benefit of priority of the prior Japanese Patent Application No. 2011-214610, filed on Sep. 29, 2011, the entire contents of which are incorporated herein by reference.

FIELD

The embodiments discussed herein are related to a storage apparatus, a control apparatus, and a storage apparatus control method.

BACKGROUND

Along with the advancement and popularization of information technology, storage apparatuses capable of reading and writing data with respect to storage media, such as magnetic disks, optical disks, and semiconductor memories are in wide use in recent years. The use of such a storage apparatus facilitates large amounts of data to be stored in storage media. Some storage apparatuses use a part of storage media as a backup area in which a copy of original data is stored as backup data in order to prevent destruction of the original data. The following technologies are known in regard to free space management of storage media.

Japanese Laid-open Patent Publication No. 2004-280333
Japanese Laid-open Patent Publication No. 2010-86393

When writing and deletion of backup data are repeated in a storage apparatus, it is sometimes the case that an area for storing backup data becomes discontinuous. In the case where a backup area used to store backup data is discontinuous, the load on the storage system, such as processing load associated with reading and writing of the backup data and management, may increase.

SUMMARY

According to one aspect, there is provided a storage apparatus including one or more storing units and a control unit configured to control backup of data to a backup area provided in the storing units. The control unit includes a pointer control unit which controls, in the backup area, an available area start pointer indicating the start of an available area that is available for the backup and an available area end pointer indicating the end of the available area; a backup instruction receiving unit which receives a backup instruction related to control of the backup; a backup processing unit which performs, when the backup instruction is a backup start instruction instructing a start of the backup, a backup process in which the available area is allocated to backup target data based on the backup start instruction, the allocation of the available area being started from a position indicated by the available area start pointer; a releasing unit which releases, when the backup instruction is a backup end instruction instructing the end of the backup, an area allocated to backup target data based on the backup end instruction; and a determining unit which determines whether the released area is adjacent to a position indicated by the available area end pointer. When the determining unit determines affirmatively, the pointer control unit moves the available area end pointer to the end of the released area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an available area pointer table according to the second embodiment;

FIG. 7 illustrates a backup area configuration table according to the second embodiment;

FIG. 8 illustrates a backup table according to the second embodiment;

FIG. 9 illustrates control information according to the second embodiment;

DESCRIPTION OF EMBODIMENTS

Figure 1:
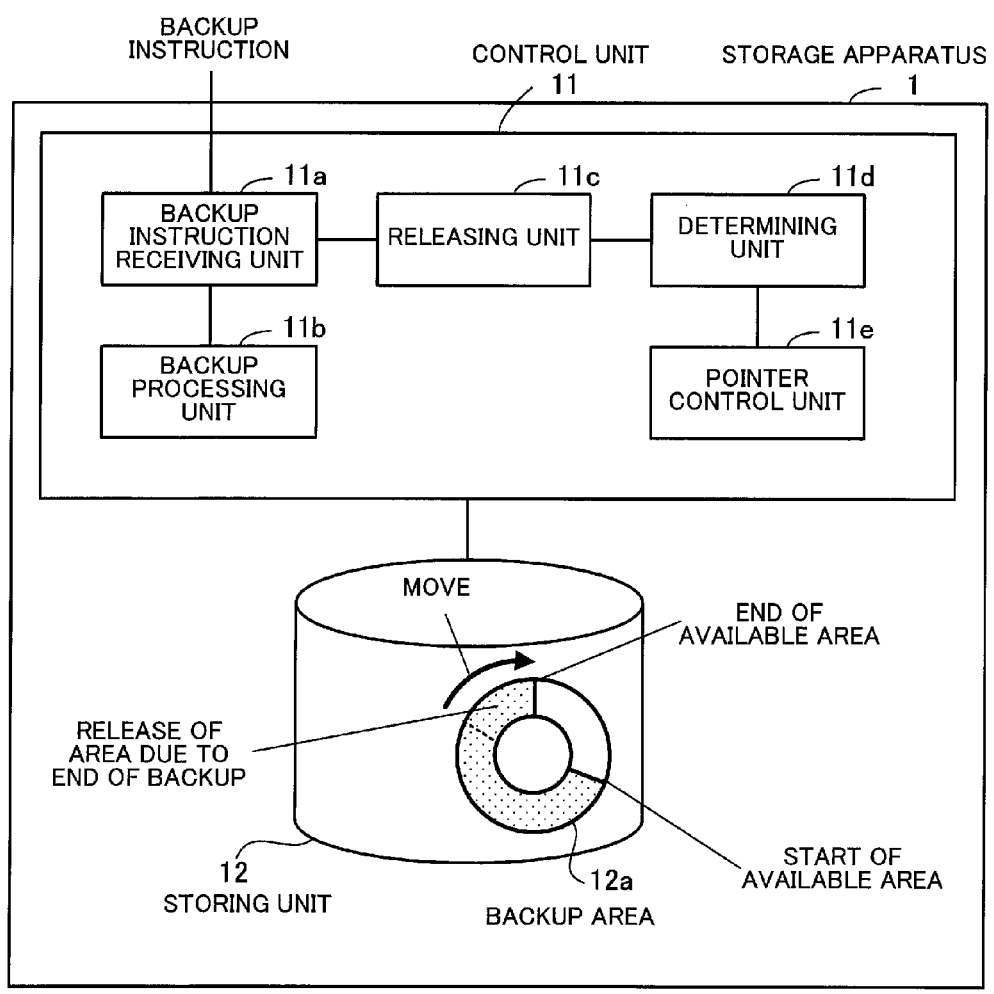
FIG. 1 illustrates a storage apparatus according to a first embodiment.

Several embodiments will be described below with reference to the accompanying drawings, wherein like reference numerals refer to like elements throughout.

(a) First Embodiment

FIG. 1 illustrates a storage apparatus according to a first embodiment. A storage apparatus 1 of this embodiment includes a control unit 11 and a storing unit 12. The control unit 11 includes a backup instruction receiving unit 11a, a backup processing unit 11b, a releasing unit 11c, a determining unit 11d, and a pointer control unit 11e. The storing unit 12 includes a backup area 12a. Note that the backup area 12a is logically managed as a ring-shaped storage area. In the case where the backup area 12a is a ring-shaped storage area, a storage area following a storage area at the last address of the backup area 12a is a storage area at the first address of the backup area 12a (i.e., the storage area at the first address of the backup area 12a follows the storage area at the last address of the backup area 12a). For example, in the case where an available area start pointer or an available area end pointer is moved to the next storage area after the last address of the backup area 12a, the pointer is moved to the first address of the backup area 12a. With this, the backup area 12a is used in a cyclically repeated manner.

The backup instruction receiving unit 11a receives a backup instruction related to backup control from a higher-level apparatus, such as a host computer. With this, a backup process is started in which backup of original data is written to the backup area 12a of the storing unit 12. In the case where the backup instruction received by the backup instruction receiving unit 11a is a backup start instruction which indicates the start of backup, the backup processing unit 11b starts a backup process from a position indicated by the available area start pointer of the backup area 12a based on the backup start instruction. In the case where the backup instruction received by the backup instruction receiving unit 11a is a backup end instruction which indicates the end of backup, the releasing unit 11c releases, of the backup area 12a, an allocated storage area to which backup data has been written based on the backup end instruction. The determining unit 11d determines whether the storage area released by the releasing unit 11c is, in the backup area 12a, adjacent to a position indicated by the available area end pointer. Being "adjacent" here means that the first address of the released storage area is an address following the position indicated by the available area end pointer. The pointer control unit 11e controls, in the backup area 12a, the available area start pointer indicating the start of an "available area", which is an area available for backup, and the available area end pointer indicating the end of the available area. In the case where the determining unit 11d determines that the storage area released by the releasing unit 11c is, in the backup area 12a, adjacent to the position indicated by the available area end pointer, the pointer control unit 11e moves the available area end pointer to the end of the storage area released by the releasing unit 11c.

The storage unit 12a includes the backup area 12a for storing backup data. The storing unit 12 may be a hard disk drive (HDD), a non-volatile semiconductor memory, a magnetic storage device other than a HDD, an optical disk, or another storage medium capable of storing data. The storing unit 12 may be a physical volume which is a part or all of the storage area of the storage medium, or a logical volume set using one or more physical volumes. The storing unit 12 may be a disk array constituted by multiple storing units.

As described above, in the first embodiment, in the case where the released storage area is adjacent to the position indicated by the available area end pointer, the pointer control unit 11e moves the available area end pointer to the end of the released storage area. This prevents a reduction in the continuity of the area for storing backup data.

(b) Second Embodiment

Figure 2:
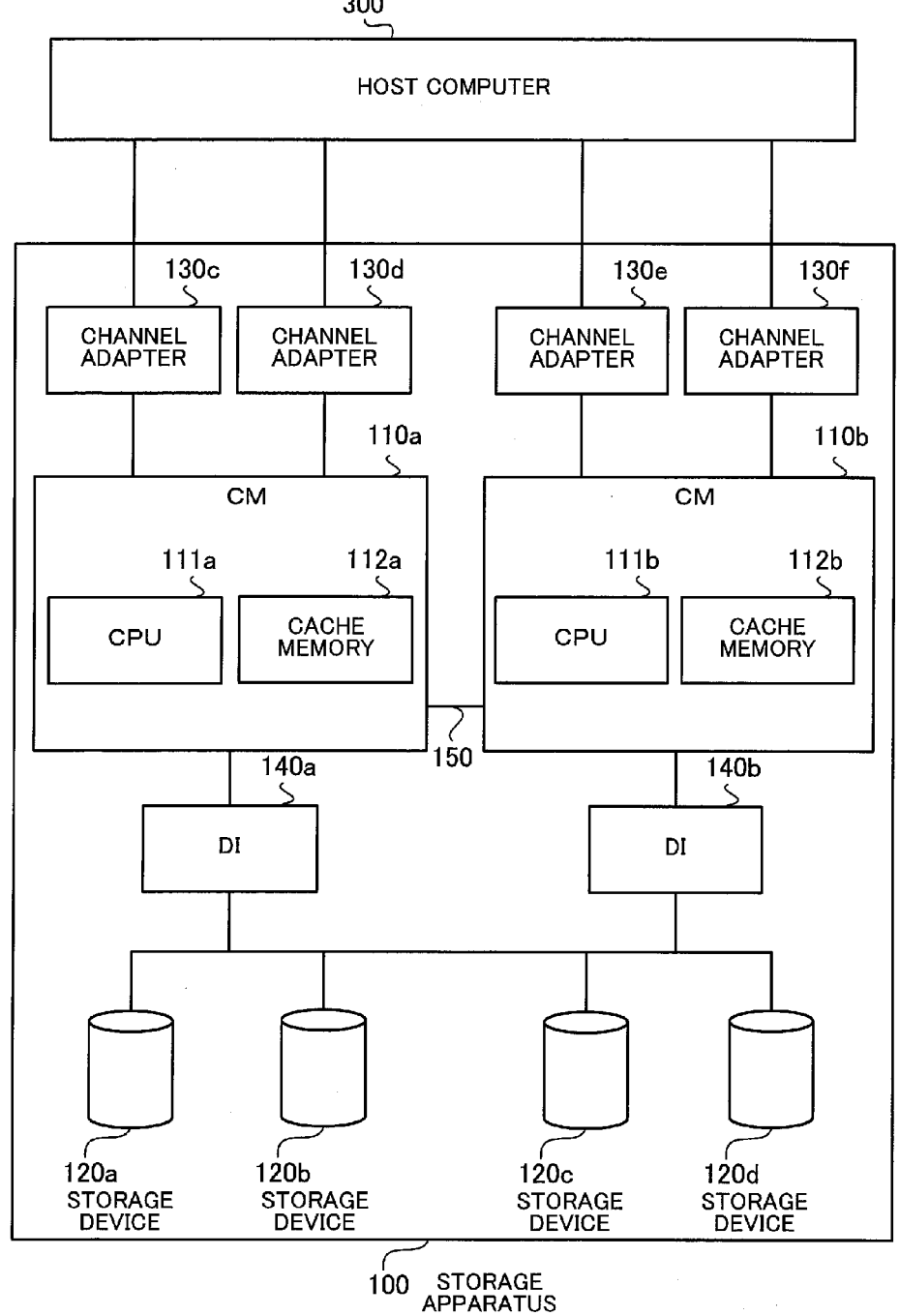
FIG. 2 illustrates a hardware configuration of a storage apparatus according to a second embodiment.

Next described is a second embodiment in which the function of the storage apparatus 1 of FIG. 1 to prevent a reduction in the continuity of the backup area is applied to a storage apparatus 100 having a storage device group which forms RAID (Redundant Arrays of Inexpensive Disks). FIG. 2 illustrates a hardware configuration of a storage apparatus according to the second embodiment. The storage apparatus 100 includes controller modules (CMs) 110a and 110b for exercising overall control over the entire apparatus, storage devices 120a, 120b, 120c, and 120d, channel adapters 130c, 130d, 130e, and 130f, and device interfaces (DIs) 140a and 140b. The storage apparatus 100 inputs and outputs data to and from multiple storage devices, such as hard disk drives described below. The storage apparatus 100 has RAID functions such as RAID 0 to 6. The storage apparatus 100 integrates multiple storage devices to configure RAID, to thereby manage each RAID as one storage device. The host computer 300 is a computer for executing operational processing, and is connected to the storage apparatus 100, via a storage area network (SAN) formed using a fibre channel, to enable data communication therebetween. The host computer 300 is configured to store, in the storage apparatus 100, data to be used for the operational processing, and read the data from the storage apparatus 100.

The CM 110a includes a central processing unit (CPU) 111a and a cache memory 112a. The CPU 111a performs various types of control by executing processing according to an operating system (OS) or the like. In addition, the CPU 111a manages resources such as the cache memory 112a, the storage devices 120a to 120d, the channel adapters 130c to 130f, and the DIs 140a and 140b. The cache memory 112a stores control data required by the CPU 111a to control the storage apparatus 100. In addition, the cache memory 112a temporarily stores write data transmitted from the host computer 300 and to be stored in the storage devices 120a to 120d and read data obtained from the storage devices 120a to 120d in response to a read request transmitted from the host computer 300 and to be transmitted to the host computer 300. The channel adapters 130c and 130d perform connection control between the host computer 300 and the CM 110a. The channel adapters 130e and 130f perform connection control between the host computer 300 and the CM 110b. For example, on receiving a request from the host computer 300, the channel adapter 130c performs connection control with respect to the CM 110a. Note that although communication between the channel adapters 130c and 130d and the host computer 300 is established by the SAN formed using a fibre channel, a different connection method other than a fibre channel may be used instead. In addition, communication between the channel adapters 130c and 130d and the host computer 300 may be established using an exclusive line or a virtual private network (VPN) so that the storage apparatus 100 is installed remotely from the host computer 300. The DI 140a performs connection control between the CM 110a and the storage devices 120a to 120d. The DI 140b performs connection control between the CM 110b and the storage devices 120a to 120d. In addition, the CMs 110a and 110b are connected by a bus 150. Via the bus 150, control information and data are communicated between the CMs 110a and 110b. In addition, the CMs 110a and 110b function as control devices and are detachable from the storage apparatus 100. Since the CM 110b here includes a CPU 111b and a cache memory 112b and has the same configuration as that of the CM 110a, the descriptions of the CM 110b are omitted herein.

The storage devices 120a to 120d are hard disk drives configurable for RAID, and store user data transmitted from the host computer 300. Note that each set of user data does not have to be stored in a single hard disk, and may be stored across multiple hard disks. In addition, multiple sets of user data may be stored in a single hard disk. The storage devices 120a to 120d may be, for example, non-volatile semiconductor memories such as solid state drives (SSD), magnetic storage devices other than hard disk drives, optical disks, or other storage media capable of storing data. A magnetic tape is an example of a magnetic storage device other than a hard disk drive. Examples of an optical disk include a digital versatile disc (DVD), a DVD random access memory (DVD-RAM), a compact disk read only memory (CD-ROM), and a CD rewritable (CD-RW). Note that in FIG. 2, there are two CMs (110a and 110b), one DI (140a/140b) is provided for each of the CMs (110a and 110b), and two each of channel adapters (130c and 130d/130e and 130f) are provided for each of the CMs (110a and 110b), however, the number of each of these components is arbitrary. In addition, one host computer (300) is connected to the storage apparatus 100 in FIG. 2, however, multiple host computers may be connected to the storage apparatus 100. In addition, an extension apparatus (not illustrated) which includes a control unit and a storage device and is subordinate to and controlled by the CMs 110a and 110b may be connected to the storage apparatus 100. The processing functions of the second embodiment may be implemented using the above-described hardware configuration.

Figure 3:
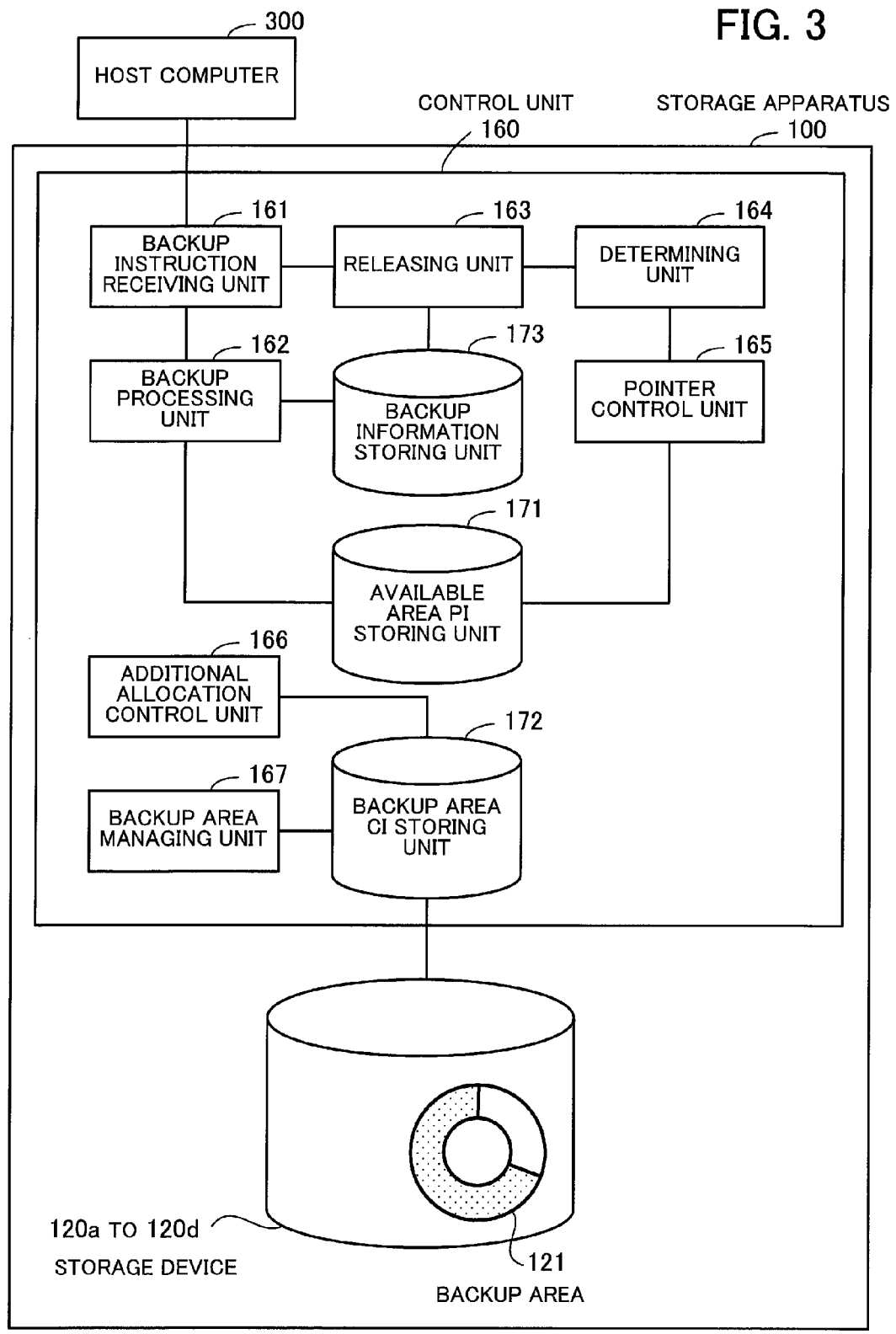
FIG. 3 is a block diagram illustrating functions of the storage apparatus of the second embodiment.

FIG. 3 is a block diagram illustrating functions of the storage apparatus according to the second embodiment. The storage apparatus 100 of the second embodiment includes a control unit 160 and the storage devices 120a to 120d. The control unit 160 includes a backup instruction receiving unit 161, a backup processing unit 162, a releasing unit 163, a determining unit 164, a pointer control unit 165, an additional allocation control unit 166, a backup area managing unit 167, an available area pointer information (PI) storing unit 171, a backup area configuration information (CI) storing unit 172, and a backup information storing unit 173. The storage devices 120a to 120d include a backup area 121. Note that the backup area 121 is a ring-shaped logical storage area. That is, an address following the last address of the backup area 121 is the first address of the backup area 121. With this, the backup area 121 is used in a cyclically repeated manner.

The backup instruction receiving unit 161 receives a backup instruction related to backup control from the host computer 300. With this, a backup process is started in which backup of original data is written to the backup area 121 of the storage devices 120a to 120d. The backup instruction is, for example, an instruction for backup irregularly carried out. One type of backup irregularly carried out is backup of data which is an operational target in an operation performed by a user using the host computer 300. In the case of backup irregularly carried out, the backup process is started at the beginning of the operation. During the backup process, data updated in the operation is frequently backed up. Data to be backed up is, for example, data (a file or folder) read from the storage devices 120a to 120d for the operation in the host computer 300. With the end of the operation by the user, the backup process is also ended.

In the case where the backup instruction received by the backup instruction receiving unit 161 is a backup start instruction instructing the start of backup, the backup processing unit 162 starts a backup process from a position indicated by an available area start pointer of the backup area 121 based on the backup start instruction. For example, by the backup start instruction, data stored in a storage area other than the backup area 121 in the storage devices 120a to 120d is designated as a backup target. The backup processing unit 162 creates backup data from the designated data and writes the created backup data to a backup available area in the backup area 121. In addition, the backup available area to which the backup data is written becomes a backup data area. Note that the backup data created from the backup target data is, for example, a copy of the backup target data. In addition, the backup data may be created by compressing the backup target data. Here, a backup data area is provided with respect to each set of backup data. That is, in the case where there are multiple sets of backup data, a backup data area is provided with respect to each of the multiple sets of backup data. In addition, also in the case where multiple sets of backup data are created for a single portion of the same original data, a backup data area is provided with respect to each of the multiple sets of backup data. For example, in the case where original data is the same but there are multiple users performing updates, a different set of backup data is created with respect to each user and a backup data area corresponding to each set of backup data is provided. In addition, in the case where the use of each set of backup data ends, the set of backup data is deleted and a corresponding backup data area is released after an update of the set of backup data is reflected to the original data, or without the update being reflected to the original data.

In the case where the backup instruction received by the backup instruction receiving unit 161 is a backup end instruction instructing the end of backup, the releasing unit 163 releases a backup data area which is an allocated storage area in the backup area 121, based on the backup end instruction. The determining unit 164 determines whether the storage area released by the releasing unit 163 is, in the backup area 121, adjacent to the position indicated by the available area end pointer. In addition, the determining unit 164 determines whether, due to a move of the available area end pointer, a storage area for which a status flag in control information has been set to "released" by the pointer control unit 165 is, in the backup area 121, adjacent to the location indicated by the available area end pointer. The pointer control unit 165 controls, in the backup area 121, the available area start pointer indicating the start of a "backup available area" which is an area available for backup and the available area end pointer indicating the end of the backup available area. In the case where the determining unit 164 determines that the storage area released by the releasing unit 163 is, in the backup area 121, adjacent to the position indicated by the available area end pointer, the pointer control unit 165 moves the available area end pointer to the end of the storage area released by the releasing unit 163. On the other hand, if the determining unit 164 determines that the storage area released by the releasing unit 163 is, in the backup area 121, not adjacent to the position indicated by the available area end pointer, the pointer control unit 165 does not move the available area end pointer, and sets the status flag of control information for the storage area released by the releasing unit 163 in such a manner as to indicate that the storage area is a released area. In addition, in the case where the determining unit 164 determines that, due to the move of the available area end pointer, the released area is adjacent to the position indicated by the available area end pointer, the pointer control unit 165 moves the available area end pointer to the end of the released area.

In the case where the storage capacity of the backup area 121 is reduced, the additional allocation control unit 166 allocates an additional volume to the backup area 121, to thereby increase the storage capacity of the backup area 121. At this point, the additional allocation control unit 166 allocates a storage area added to the backup area 121 due to the additional volume to a backup available area between the position indicated by the available area start pointer and the position indicated by the available area end pointer. In addition, in the case where the usage rate of the backup area 121 becomes less than or equal to a predetermined rate, the additional allocation control unit 166 deletes, from the backup area 121, a volume all of which storage areas are included in a backup available area. The usage rate of the backup area 121 here means a proportion of an area in which backup data is stored to the entire backup area 121. With this, in the case where the backup area 121 has excess area, the number of volumes in the backup area 121 is reduced and a deleted volume is converted to other use such as a standby volume. The backup area managing unit 167 manages the backup area 121 based on backup area configuration information and addresses allocated to storage areas of individual volumes. The backup area configuration information is stored in the backup area CI storing unit 172 and includes volume information which is identification information for identifying volumes provided for the backup area 121. The details are described in FIG. 7.

The available area PI storing unit 171 stores available area pointer information which indicates addresses of the available area start pointer and the available area end pointer. The backup area CI storing unit 172 stores backup area configuration information indicating, among volumes set in the storage devices 120a to 120d, the volumes constituting the backup area 121. The backup information storing unit 173 stores backup data information which is information related to backup data stored in the backup area 121 and indicates, for example, a file name of each set of backup data, a storage location of each set of original data, a storage location of each set of backup data, and a date and time of each backup.

The storage devices 120a to 120d are, for example, hard disk drives configuring RAID, and store data transmitted from the host computer 300 and data to be transmitted to the host computer 300. The storage devices 120a to 120d include the backup area 121 for storing backup data. The backup area 121 is set using one or more volumes included in the storage devices 120a to 120d. The storing devices 120a to 120d may be non-volatile semiconductor memories, magnetic storage devices other than hard disk drives, optical disks, or other storage media capable of storing data. According to the second embodiment, the volumes included in the storage devices 120a to 120d are physical volumes which are part or all of the storage area of a storage medium. However, the volumes included in the storage devices 120a to 120d are not limited to this case, and may be logical volumes set in one or more physical volumes. The volumes included in the storage devices 120a to 120d function as storage units.

Figure 4:
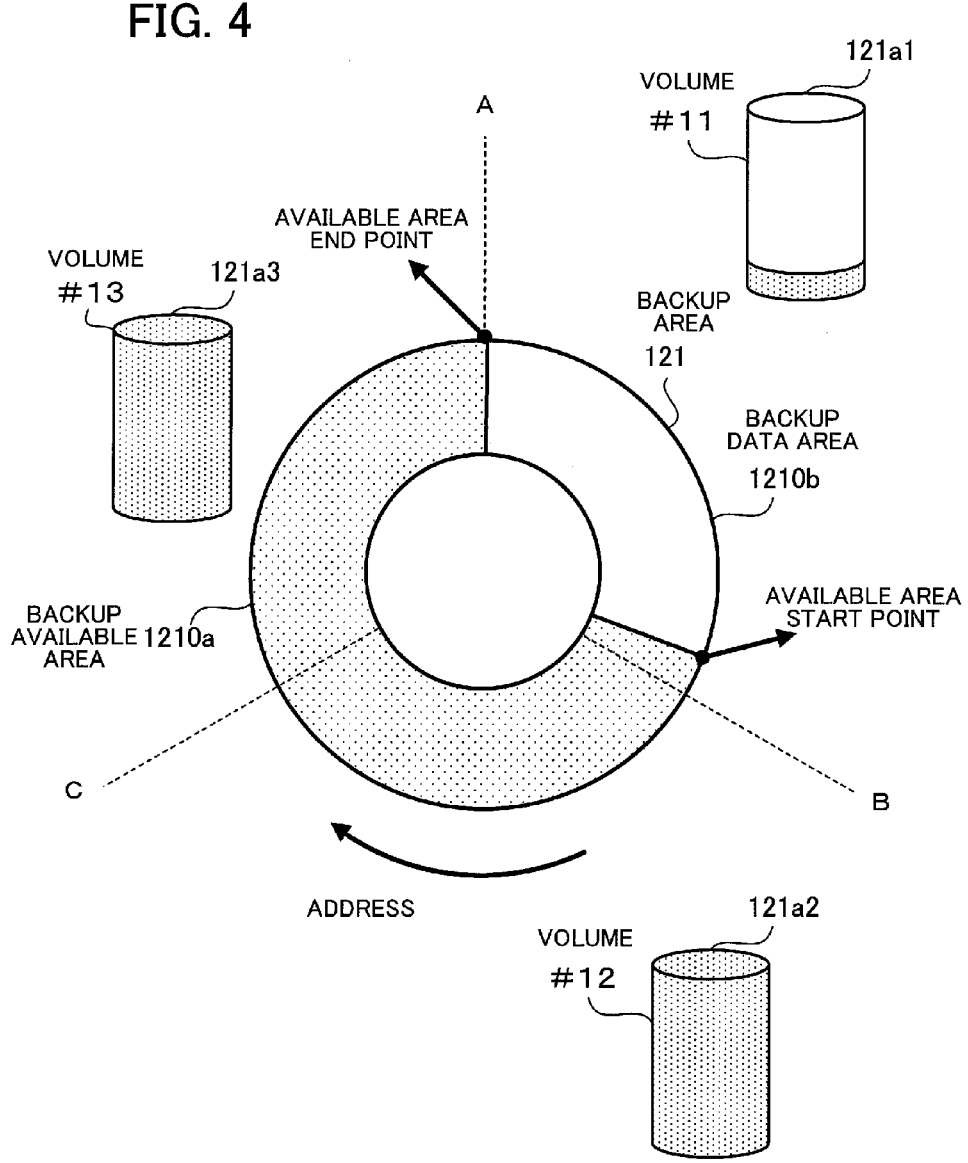
FIG. 4 illustrates a backup area according to the second embodiment.

FIG. 4 illustrates a backup area according to the second embodiment. In the storage apparatus 100 of the second embodiment, the backup area 121 is made up of a volume 121a1 (Volume #11), a volume 121a2 (Volume #12), and a volume 121a3 (Volume #13) included in the storage devices 120a to 120d. The volumes 121a1 to 121a3 are physical volumes, which are storage areas sectionalized according to partitions in the storage devices 120a to 120d. Note however that the volumes 121a1 to 121a3 are not limited to this case, and may be logical volumes each of which is formed by virtually integrating multiple physical volumes. In the case where the backup area 121 is made up of physical volumes, the continuity of the storage areas may be further increased since physical addresses are sequential in the physical volumes. In the case where the backup area 121 is made up of logical volumes, setting freedom of each volume is improved, which increases the usage efficiency of the storage areas of the storage devices. In the backup area 121, addresses in the volumes 121a1 to 121a3 are arranged in a clockwise direction, as illustrated in FIG. 4. The backup area 121 includes a backup available area 1210a and a backup data area 1210b. A portion between dotted lines A and B of the backup area 121 is a storage area of the volume 121a1. A portion between dotted lines B and C of the backup area 121 is a storage area of the volume 121a2. A portion between the dotted lines C and A of the backup area 121 is a storage area of the volume 121a3. The backup available area 1210a is a free space available for storing backup data, and is set over storage area of one or more volumes (for example, the volumes 121a1 to 121a3). The backup available area 1210a is a single continuous area in the view of management. The backup available area 1210a is managed by the available area start pointer indicating the address of an available area start point, which is a start position of the backup available area, and the available area end pointer indicating the address of an available area end point, which is an end position of the backup available area. That is, an area between the available area start pointer and the available area end pointer is the backup available area 1210a. Each of the available area start pointer and available area end pointer indicates a volume including the pointer and an address in the volume.

Figure 5:
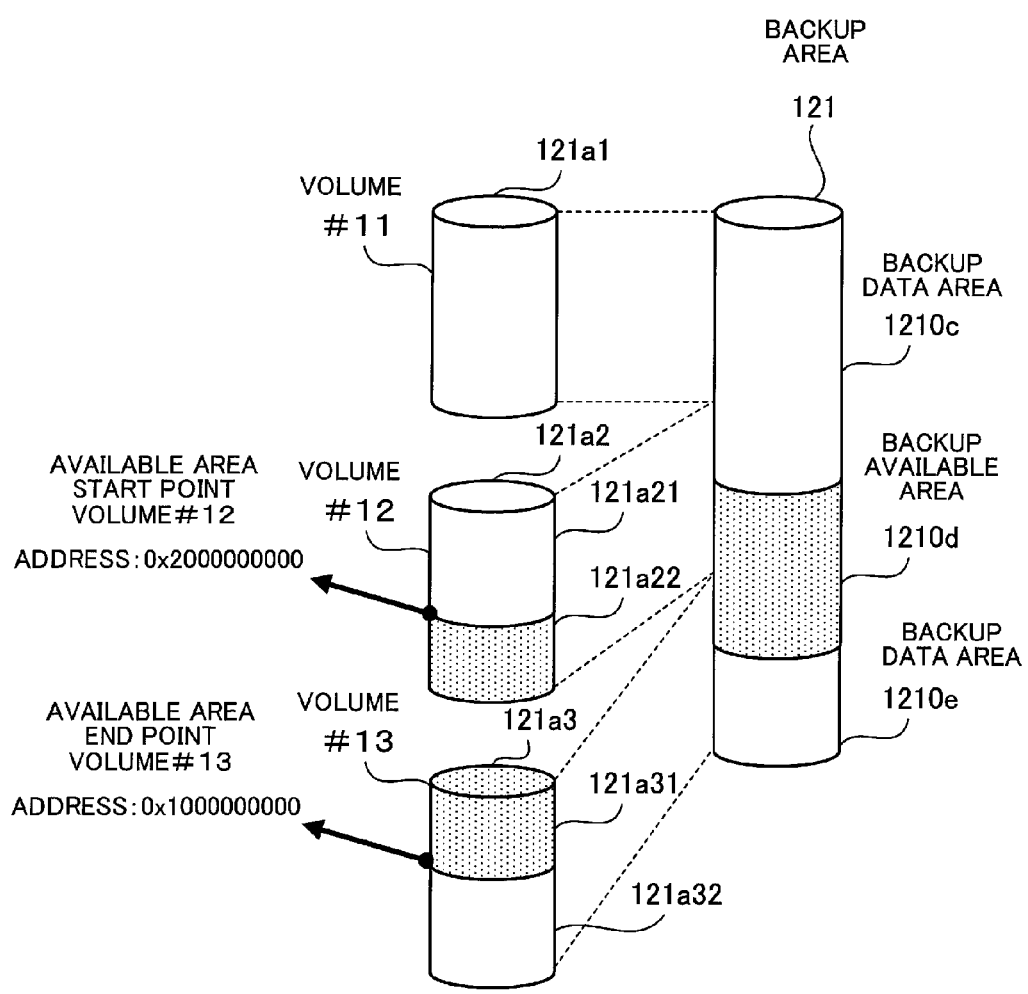
FIG. 5 illustrates volumes of the backup area according to the second embodiment.

FIG. 5 illustrates volumes of a backup area according to the second embodiment. Using volumes and addresses in the volumes, the storage apparatus 100 of the second embodiment manages the backup area 121 set using the volume 121a1 (Volume #11), the volume 121a2 (Volume #12), and the volume 121a3 (Volume #13). Specifically, assume that backup data areas 1210c and 1210e and a backup available area 1210d are set in the backup area 121, as illustrated in FIG. 5. In addition, the backup data areas 1210c and 1210e are separated into an upper part and a lower part, respectively, in FIG. 5, however, the backup area 121 is in a circular form and the backup data areas 1210c and 1210e are continuous. Assume here that a value of the available area start point indicates an address of the volume 121a2 (Volume #12), 0×2000000000. In this case, a storage area 121a22 starting from the address of the available area start point in the volume 121a2 is a part of the backup available area 1210d. In addition, a storage area 121a21 located before the address of the available area start point in the volume 121a2 is an area other than the backup available area 1210d (a backup data area or a released area, for example, a part of the backup data area 1210c). Assume also here that a value of the available area end point indicates an address of the volume 121a3 (Volume #13), 0×1000000000. In this case, a storage area 121a31 extending up to the address of the available area end point in the volume 121a3 is a part of the backup available area 1210d. In addition, a storage area 121a32 starting after the address of the available area end point in the volume 121a3 is an area other than the backup available area 1210d (a backup data area or a released area, for example, the backup data area 1210e).

FIG. 6 illustrates an available area pointer table according to the second embodiment. An available area pointer table 171a of FIG. 6 is stored in the available area PI storing unit 171 included in the storage apparatus 100 according to the second embodiment. The available area pointer table 171a stores the available area start pointer indicating a start position of the backup available area and the available area end pointer indicating an end position of the backup available area. In the available area pointer table 171a, items of "available area start pointer" and "available area end pointer" are provided. The available area start pointer is a pointer indicating a volume including a start position of the backup available area in the backup area 121 set in the storage devices 120a to 120d of the storage apparatus 100 as well as a first address. In the case of performing backup of data, the storage apparatus 100 writes backup data in the backup available area using the address indicated by the available area start pointer as a first address. When finishing the write operation of writing the backup data to the backup available area, the storage apparatus 100 moves the available area start pointer to the end of the backup data area to which the backup data is written. With this, the start position of the backup available area is moved, and when a write operation of writing backup data is performed next time, an address indicated by the moved backup available area pointer is used as a first address. The available area end pointer is a pointer indicating a volume including an end position of the backup available area in the backup area 121 set in the storage devices 120a to 120d of the storage apparatus 100 as well as the last address. Assume that, in the storage apparatus 100, a set of backup data is no longer necessary and a backup data area to which the set of backup data has been written is going to be released. In this case, if the area to be released is adjacent to the end of the backup available area and not adjacent to another released area (to be described later with reference to FIGS. 12 and 13), the storage apparatus 100 moves the available area end pointer to the last address of the backup data area targeted for the releasing operation. With this, the end position of the backup available area is moved, and the storage capacity of the backup available area is increased. In addition, the continuity of the backup available area after the releasing operation is maintained.

FIG. 7 illustrates a backup area configuration table according to the second embodiment. A backup area configuration table 172a of FIG. 7 is stored in the backup area CI storing unit 172 included in the storage apparatus 100 of the second embodiment. The backup area configuration table 172a stores backup configuration information indicating, among volumes set in the storage devices 120a to 120d, volumes making up of the backup area 121. In the backup area configuration table 172a, items of "configuration number" and "volume information" are provided. Configuration numbers indicate a sequential order of the volumes making up of the backup area. The storage apparatus 100 may set the configuration numbers of the individual volumes, for example, in ascending order. Storage areas of the volumes making up of the backup area are used as virtually sequential areas in the order indicated by the configuration numbers of the volumes. In FIG. 7, for example, in the case where backup data is written all the way to the end of the storage area of Volume #11 during a backup data write operation, the subsequent backup data write operation is started from the top of the storage area of Volume #12. Similarly at the time of releasing of a backup data area by deleting backup data and at the time of moving the available area start pointer and the available area end pointer, the storage areas of the individual volumes are used as virtually sequential areas according to the configuration numbers. In each field under the volume information item, information for identifying a volume set in the storage devices 120a to 120d is provided.

FIG. 8 illustrates a backup table according to the second embodiment. A backup table 173a of FIG. 8 is stored in the backup information storing unit 173 included in the storage apparatus 100 of the second embodiment. The backup table 173a stores backup information related to backup data recorded in the backup area 121. In the backup table 173a, items of "file name", "copy source information", "copy destination information", and "date and time" are provided. Each entry under the file name item includes identification information for identifying a file name of each set of backup data. For the file name, a file name of source data targeted for backup may be used. Each entry under the copy source information item includes information indicating a volume, in which original data of a corresponding set of backup data is stored, as well as a first address of a storage area in which the original data is stored. The copy source information indicates a storage location of the original data. Each entry under the copy destination information item includes information indicating a volume, in which a corresponding set of backup data is stored, as well as a first address of a storage area in which the set of backup data is stored. The copy destination information indicates a storage location of the set of backup data. Although each set of backup data is stored in the backup area, the backup area does not have its own addresses, and each piece of copy destination information is indicated using a volume and an address in the volume. Each entry under the date and time item indicates a date and time at which corresponding backup is performed. In the case where sets of backup data are temporarily used, for example, when a user carries out an operation involving updates of part or all of data, a set of backup data stored in first tends to be deleted in first (First-In, First-Out (FIFO)). Therefore, in the case where sets of backup data are created and deleted according to the FIFO principle, the storage apparatus 100 of the second embodiment prevents a reduction of the continuity of the backup area by using the backup area circularly.

FIG. 9 illustrates control information according to the second embodiment. Control information 121d of FIG. 9 is one example, and such control information is stored in a first block of each of a backup data area, a backup available area, and a released area set in the backup area 121 included in the storage apparatus 100 of the second embodiment. Control information as represented by the control information 121d indicates a status of a corresponding area set in the backup area 121. In the control information, items of "status flag", "next address", and "backup size" are set with respect to each of the sectionalized areas (i.e., a backup data area, a backup available area, and a released area set in the backup area 121). The status flag item includes a flag indicating a status of a corresponding area in the backup area 121. For example, if the area is a backup available area which is a single continuous free space and is able to store backup data, "0" is set in the status flag. If the area is a free space released due to deletion of backup data but a released area not continuous with a backup available area, "1" is set in the status flag. If the area is a backup data area in which backup data is stored, "2" is set in the status flag. The next address item includes information indicating, when the area of the control information is a backup data area (status flag "2") or a released area (status flag "1") and the next area following the area of the control information is a backup data area or a backup available area, a volume in which a start position of the next area is included as well as a first address. If the area of the control information is a backup available area (status flag "0"), "0" is set in the next address item. The size item includes information indicating, when the area of the control information is a backup data area (status flag "2"), the size of data stored in the backup data area. If the area of the control information is a backup available area, "0" is set in the size item.

Figure 10:
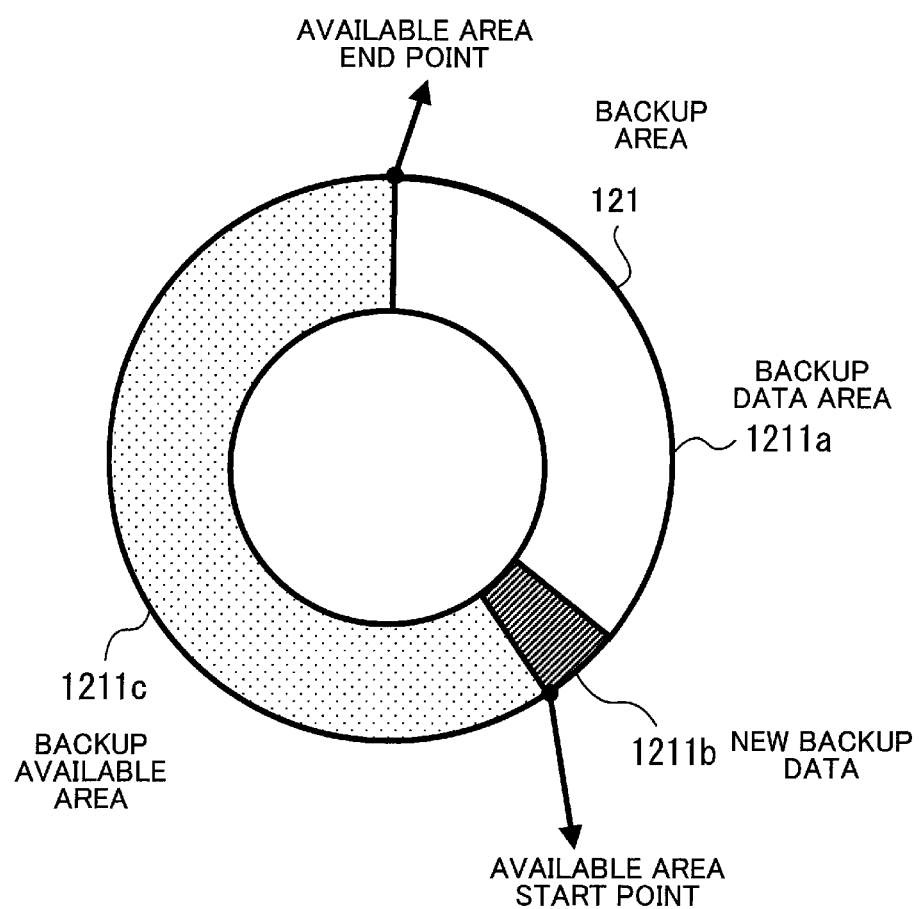
FIG. 10 illustrates the backup area at a time of writing backup data according to the second embodiment.
Figure 11:
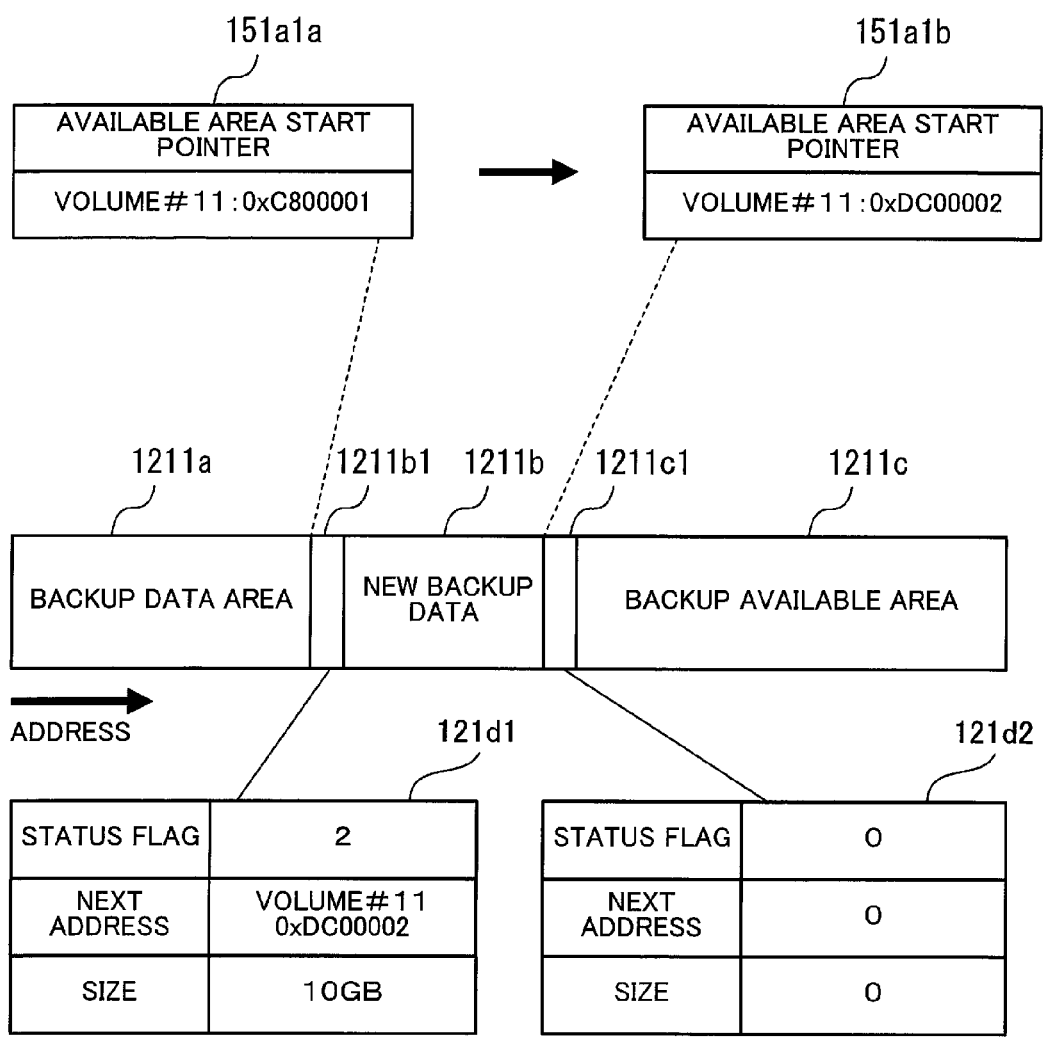
FIG. 11 illustrates operations at the time of writing the backup data according to the second embodiment.

FIG. 10 illustrates a backup area at a time of writing backup data according to the second embodiment. FIG. 11 illustrates operations at the time of writing backup data according to the second embodiment. According to FIGS. 10 and 11, next described are the operations at the time of writing backup data to the backup area 121 of the storage apparatus 100 according to the second embodiment. Assume in FIG. 10 that, when a backup data area 1211a and a backup available area 1211c have been set in the backup area 121, new backup data 1211b is written, starting from a position indicated by the available area start point of the backup available area 1211c. With this, the available area start point is moved toward the rear side (in a clockwise direction in which address values increase in FIG. 10) and, thus, the backup available area 1211c before the backup data writing is reduced to be the backup available area 1211c illustrated in FIG. 10. The position of the available area end point remains the same. The area to which the new backup data 1211b has been written becomes a backup data area immediately adjacent to the rear end of the backup data area 1211a. As illustrated in FIG. 11, in the case where a backup data area and a backup available area have been set in the backup area 121 and, then, the new backup data 1211b is written, starting from the position indicated by the available area start point of the backup available area 1211c, the available area start point is moved by the size of the new backup data 1211b in the direction in which address values increase (to the right in FIG. 11). Accordingly, an available area start pointer 151a1a corresponding to the start position of the backup available area before the backup data writing is updated to an available area start pointer 151a1b corresponding to the start position of the backup available area 1211c after the backup data writing. In addition, due to writing of the new backup data 1211b, control information 121d1 is written in a first block 1211b1 of the area to which the new backup data 1211b has been written. In the control information 121d1 corresponding to the new backup data 1211b, a value indicating a backup data area (for example, "2") is set in the status flag item. In addition, a first address of the backup available area 1211c (a value of the available area start pointer 151a1b) is set in the next address item. Further, the size of the new backup data 1211b is set in the size item. In the size item, the size of the first block 1211b1 may be included. As for control information 121d2 of a first block 1211c1 of the backup available area 1211c, each value remains the same. Specifically, a value indicating that the backup available area 1211c is a backup available area (for example, "0") is set in the status flag item. In each of the next address and size items, a value corresponding to a backup available area (for example, "0") is set. In addition, backup information of the new backup data 1211b is added to the backup information stored in the backup information storing unit 173.

Figure 12:
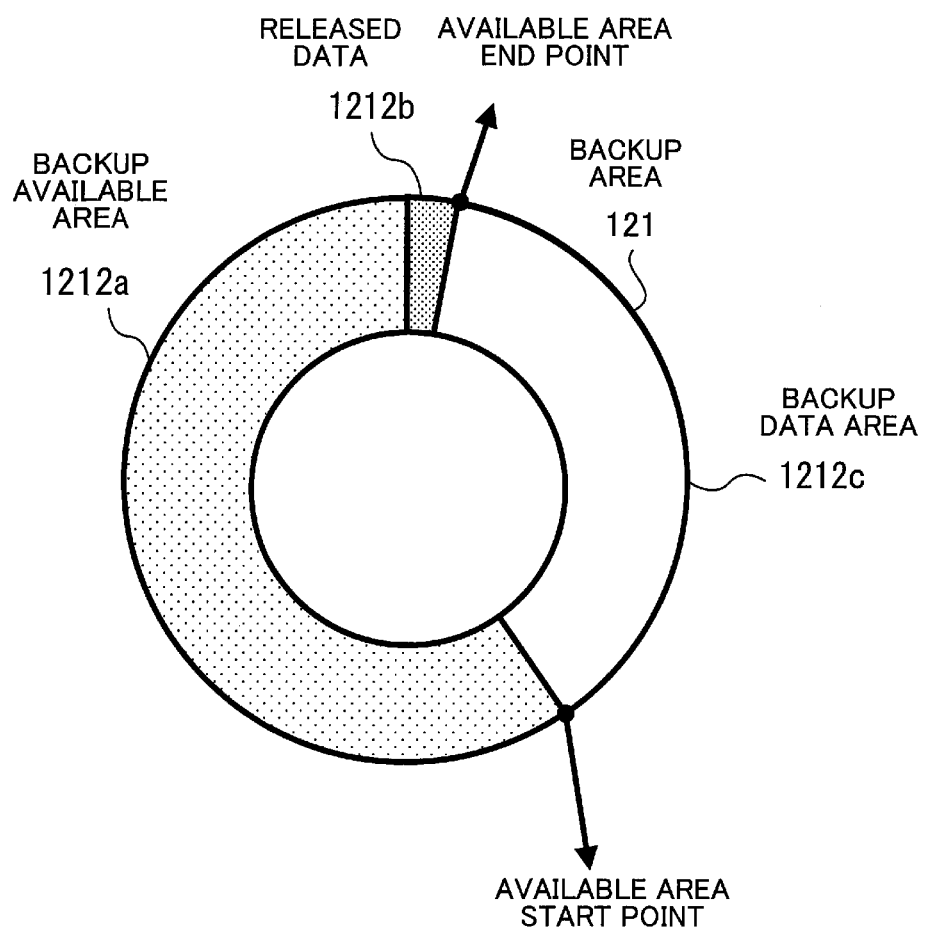
FIG. 12 illustrates the backup area at a time of releasing backup data adjacent to an available area end point but not adjacent to a released area according to the second embodiment.
Figure 13:
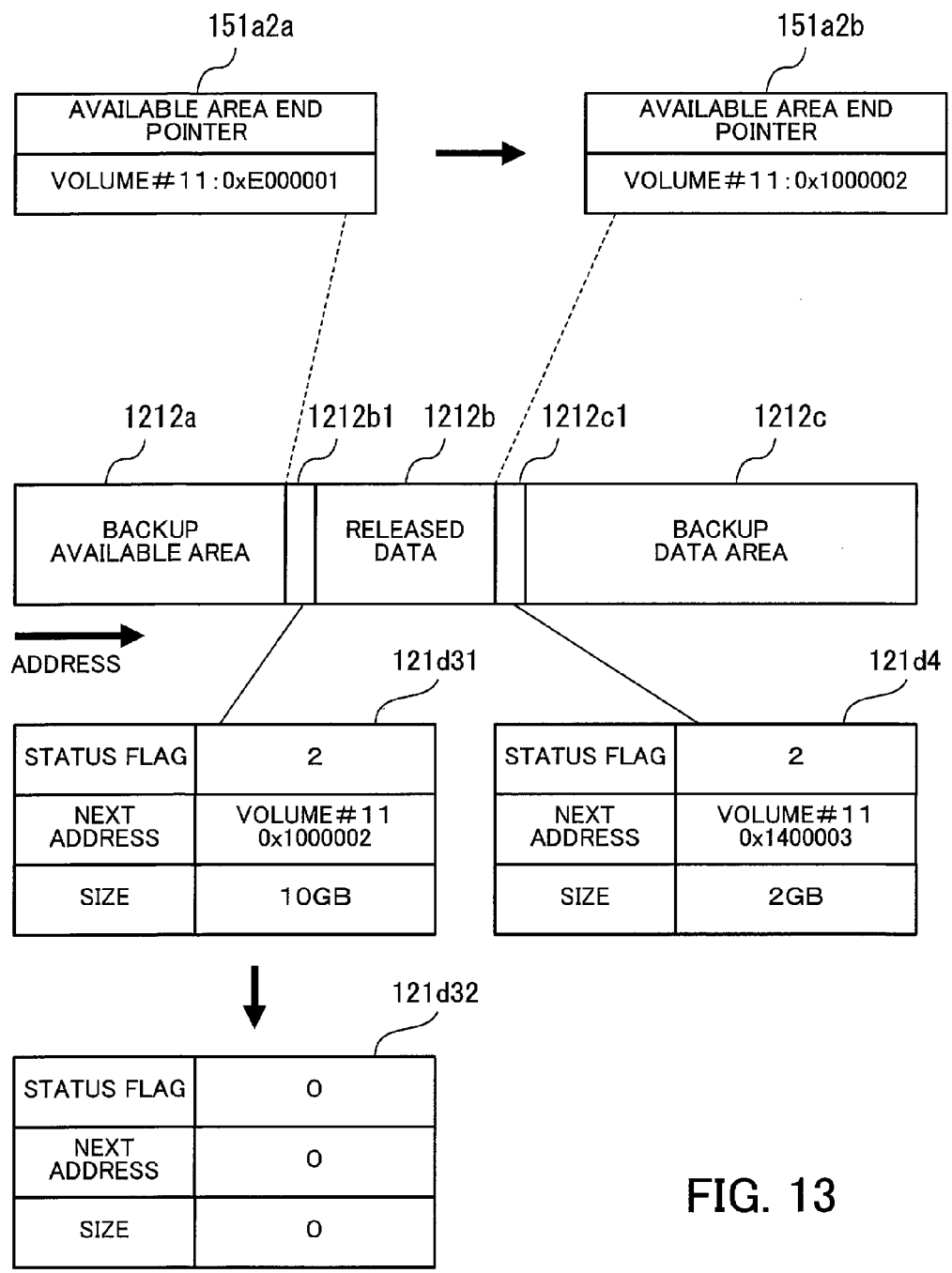
FIG. 13 illustrates operations at the time of releasing the backup data adjacent to the available area end point but not adjacent to the released area according to the second embodiment.

FIG. 12 illustrates a backup area at a time of releasing backup data adjacent to the available area end point but not adjacent to a released area according to the second embodiment. FIG. 13 illustrates operations at the time of releasing the backup data adjacent to the available area end point but not adjacent to the released area according to the second embodiment. According to FIGS. 12 and 13, next described are the operations, in the storage apparatus 100 according to the second embodiment, at the time of releasing the backup data adjacent to the available area end point but not adjacent to the released area. Assume in FIG. 12 that, when a backup available area and a backup data area have been set in the backup area 121, an area is released due to deletion of backup data immediately before the available area end point of the backup available area 1212a, and thus, released data 1212b is created. With this, the available area end point is moved toward the rear side and the area of the released data 1212b becomes a backup available area, which results in an increase in the backup available area. The position of the available area start point remains the same. In addition, the backup data area is reduced by the size of the released data 1212b, to be a backup data area 1212c. As illustrated in FIG. 13, in the case where a backup available area and a backup data area have been set in the backup area 121 and, then, an area is released due to deletion of backup data immediately before the available area end point of the backup available area 1212a and, thus, the released data 1212b is created, the available area end point is moved by the size of the released data 1212b in the direction in which address values increase. Accordingly, an available area end pointer 151a2a corresponding to the end position of the backup available area 1212a before the backup data releasing is updated to an available area end pointer 151a2b corresponding to the end position of the backup available area after the backup data releasing. In addition, due to releasing of the released data 1212b, control information 121d31 of a first block 1212b1 of the area from which the released data 1212b has been released is updated to be control information 121d32. In the control information 121d32, a value indicating a backup available area (for example, "0") is set in the status flag item. In each of the next address and size items, a value corresponding to a backup available area (for example, "0") is set. As for control information 121d4 of a first block 1212c1 of the backup data area 1212c, each value remains the same. Specifically, in the control information 121d4, a value indicating that the area is a backup data area is set in the status flag item. In the next address item, the first address of a subsequent adjacent area is set. In the size item, the size of the backup data area 1212c is set. In addition, backup information of the deleted backup data corresponding to the released data 1212b is deleted from the backup information stored in the backup information storing unit 173.

Figure 14:
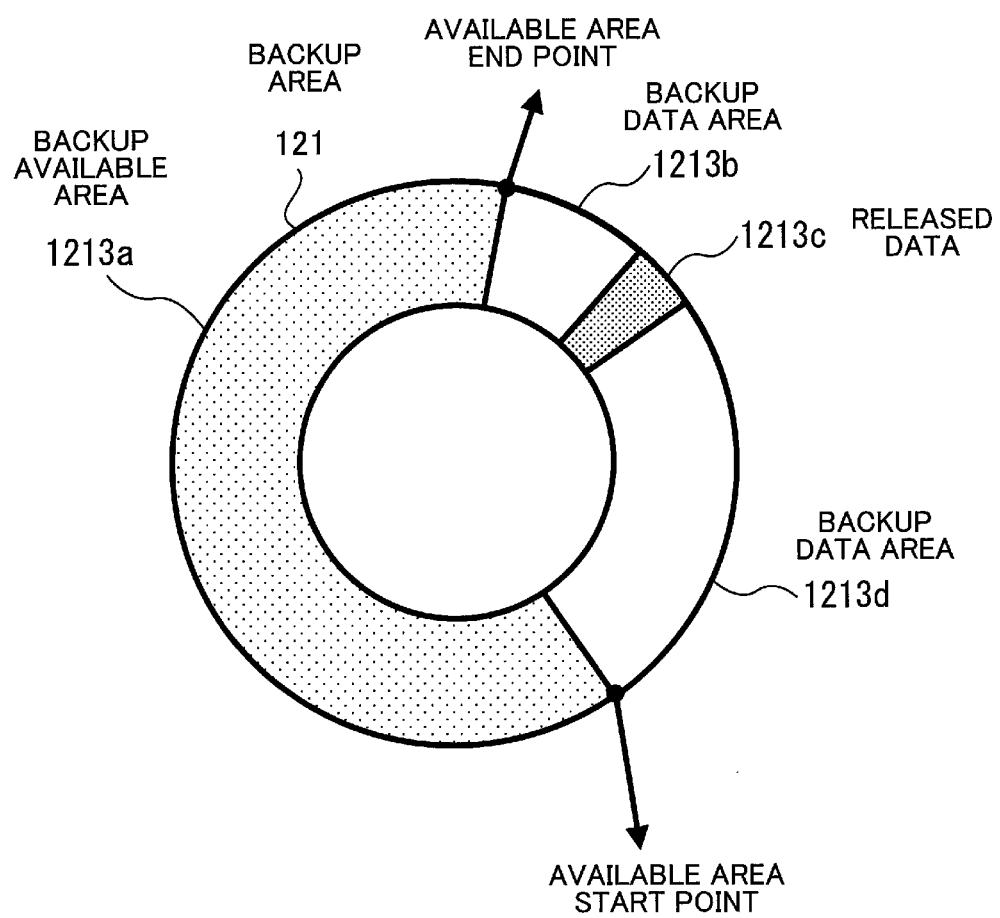
FIG. 14 illustrates the backup area at a time of releasing backup data not adjacent to the available area end point according to the second embodiment.
Figure 15:
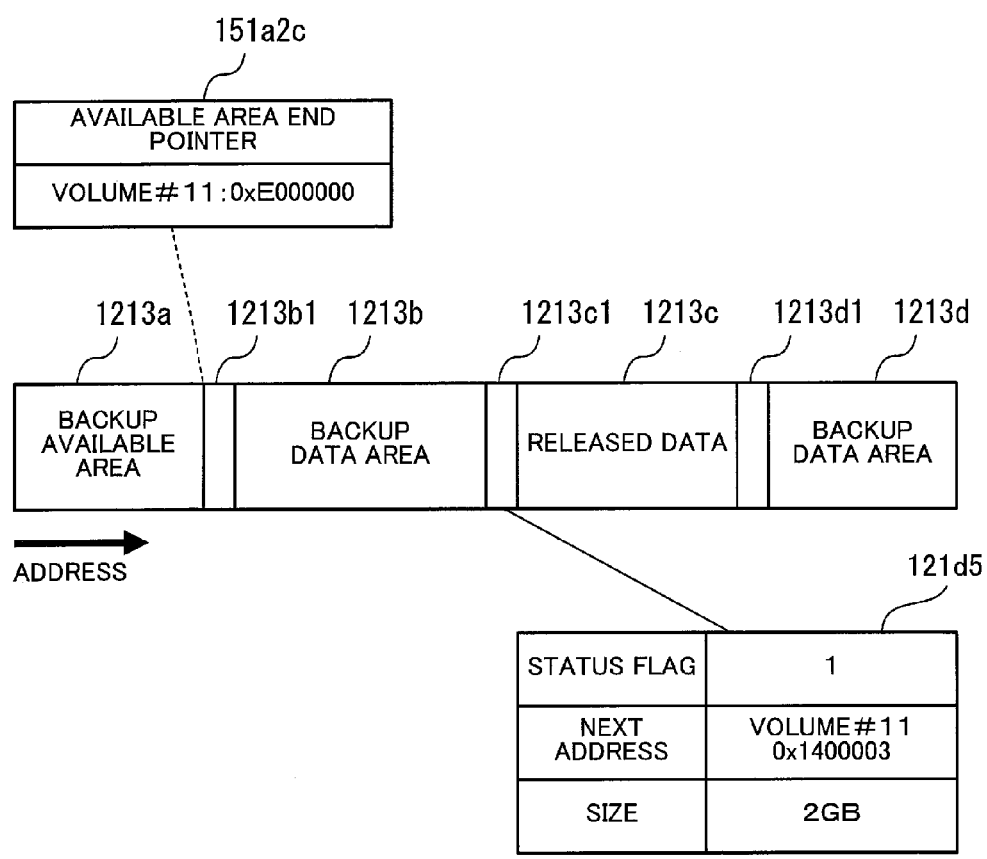
FIG. 15 illustrates operations at the time of releasing the backup data not adjacent to the available area end point according to the second embodiment.

FIG. 14 illustrates a backup area at a time of releasing backup data not adjacent to the available area end point according to the second embodiment. FIG. 15 illustrates operations at the time of releasing the backup data not adjacent to the available area end point according to the second embodiment. According to FIGS. 14 and 15, next described are the operations at the time of releasing the backup data not adjacent to the available area end point of the storage apparatus 100 according to the second embodiment. Assume in FIG. 14 that, when a backup available area and a backup data area have been set in the backup area 121, an area is released due to deletion of backup data from the middle of the backup data area and, thus, released data 1213c as well as separated backup data areas 1213b and 1213d are created. A backup available area 1213a remains the same. In addition, the positions of the available area start point and the available area end point remain the same. As illustrated in FIG. 15, in the case where a backup available area and a backup data area have been set in the backup area 121 and, then, an area is released due to deletion of backup data from the middle of the backup data area and, thus, the released data 1213c as well as the separated backup data areas 1213b and 1213d are created, the position of the available area end point remains the same. Accordingly, the value of an available area end pointer 151a2c corresponding to the end position of the backup available area 1213a before the backup data releasing remains the same after the backup data releasing. Even if the area of the released data 1213c is released, the area is not adjacent to the backup available area 1213a, and accordingly, the area from which the released data 1213c has been released becomes a released area. With this, as for control information 121d5 of a first block 1213c1 of the area from which the released data 1213*c* has been released, each value remains the same. Specifically, in the control information 121*d*5, a value indicating a released area is set in the status flag item. In the next address item, the first address of a subsequent adjacent area is set. In the size item, the size of the released area from which the released data 1213*c* has been released is set. In addition, backup information of the deleted backup data corresponding to the released data 1213*c* is deleted from the backup information stored in the backup information storing unit 173.

Figure 16:
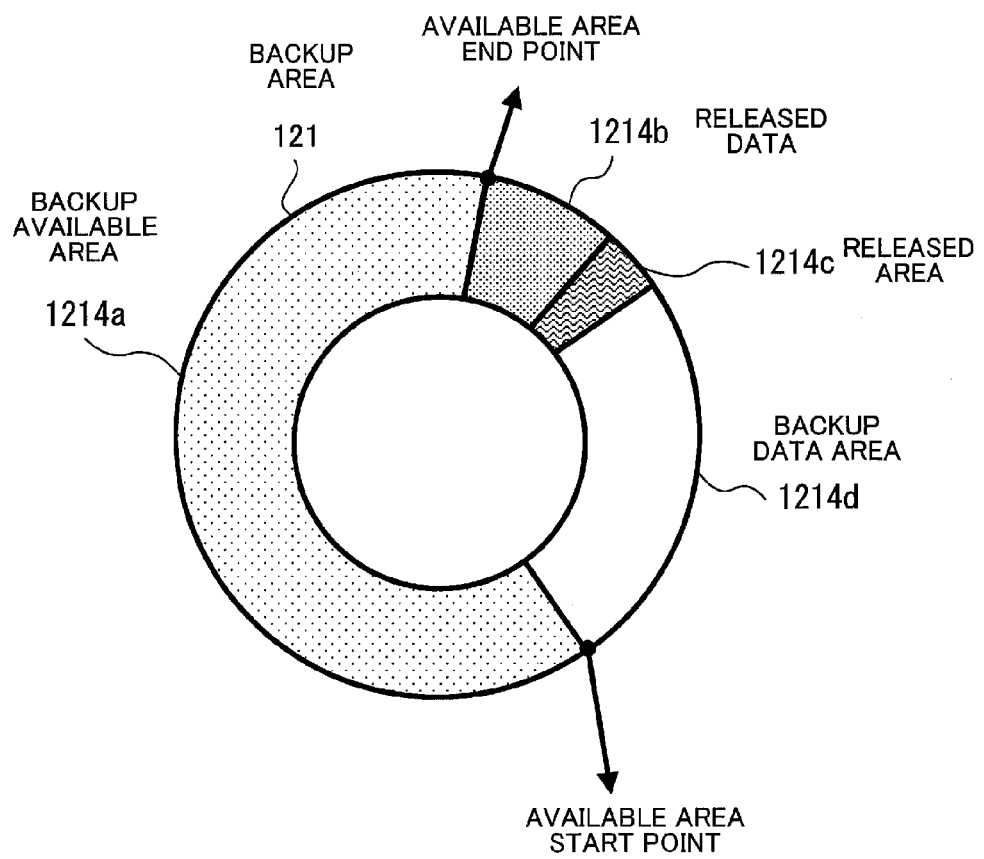
FIG. 16 illustrates the backup area at a time of releasing backup data adjacent to the available area end point and also adjacent to the released area according to the second embodiment.
Figure 17:
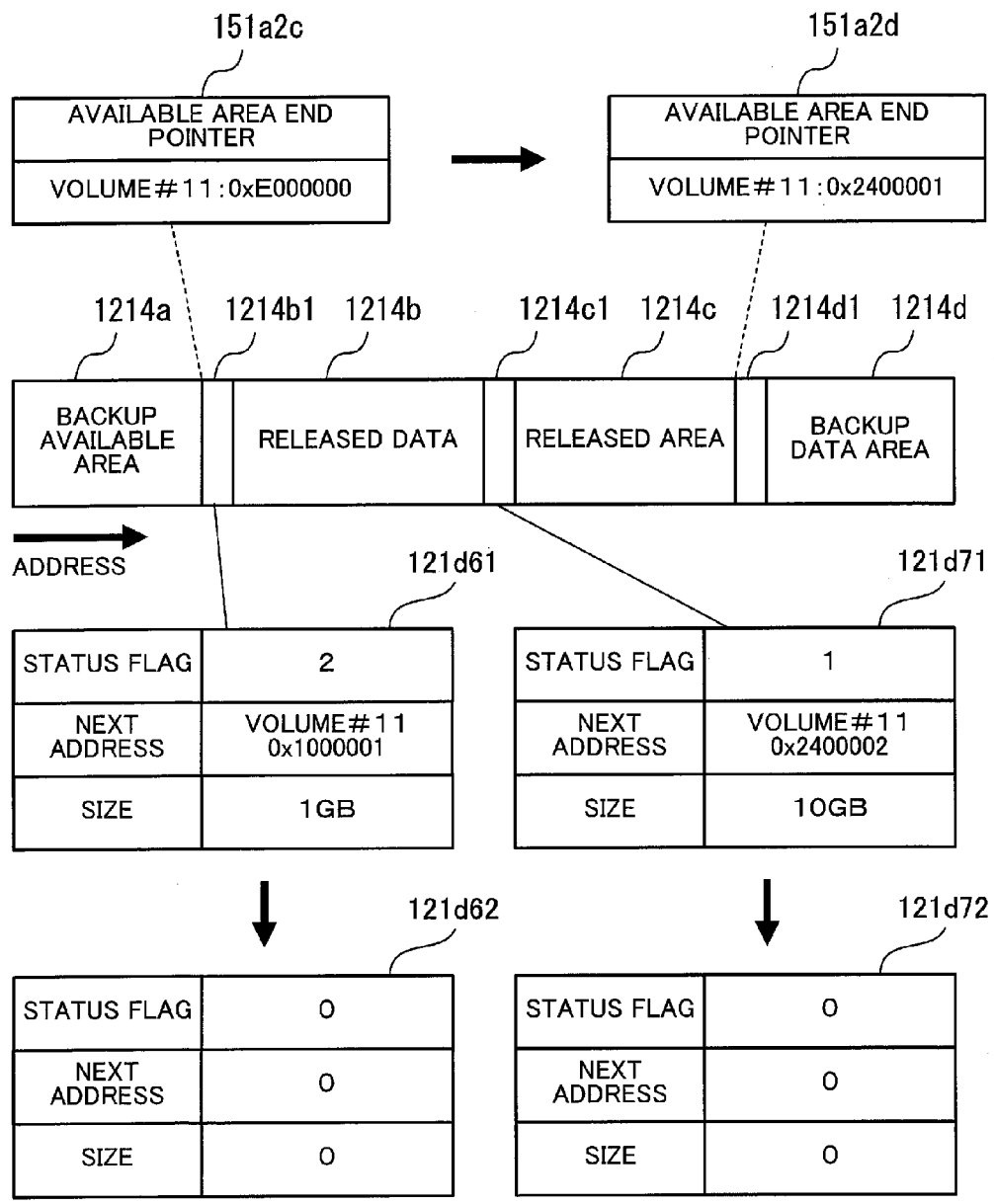
FIG. 17 illustrates operations at the time of releasing the backup data adjacent to the available area end point and also adjacent to the released area according to the second embodiment.

FIG. 16 illustrates a backup area at a time of releasing backup data adjacent to the available area end point and also adjacent to a released area according to the second embodiment. FIG. 17 illustrates operations at the time of releasing the backup data adjacent to the available area end point and also adjacent to the released area according to the second embodiment. According to FIGS. 16 and 17, next described are the operations at the time of releasing the backup data adjacent to the available area end point and also adjacent to the released area of the storage apparatus 100 according to the second embodiment. Assume in FIG. 16 that, when a backup available area, two backup data areas, and a released area between the two backup data areas are set in the backup area 121, a backup data area between a released area 1214*c* and a backup available area 1214*a* is released and, thus, released data 1214*b* is created. With this, the available area end point is moved toward the rear side and the released area 1214*c* and the area of the released data 1214*b* become available for backup, which results in an increase in the backup available area. The position of the available area start point remains the same. In addition, the backup data area is reduced by the size of the released data 1214*b*, to only leave a backup data area 1214*d*. As illustrated in FIG. 17, in the case where a backup available area, two backup data areas, and a released area between the two backup data areas have been set in the backup area 121 and, then, the backup data area between the released area 1214*c* and the backup available area 1214*a* is released and thereby the released data 1214*b* is created, the available area end point is moved by a size obtained as a sum of the released data 1214*b* and the released area 1214*c* in the direction in which address values increase. Accordingly, with reference to the next address item in control information 121*d*71 of a first block 1214*c*1 of the released area 1214*c*, the available area end pointer 151*a*2*c* corresponding to the end position of the backup available area 1214*a* before the backup data releasing is updated to an available area end pointer 151*a*2*d* corresponding to the end position of the available area after the backup data releasing (one address before the next address referred to). In addition, due to releasing of an area of the released data 1214*b*, control information 121*d*61 of a first block 1214*b*1 of the area from which the released data 1214*b* has been released is updated to control information 121*d*62. In the control information 121*d*62, a value indicating a backup available area is set in the status flag item. In each of the next address and size items, a value corresponding to a backup available area is set. In addition, due to releasing of the area of the released data 1214*b*, the released area 1214*c* becomes a backup available area. Accordingly, the control information 121*d*71 of the first block 1214*c*1 of the released area 1214*c* is updated to control information 121*d*72. In the control information 121*d*72, a value indicating a backup available area is set in the status flag item. In each of the next address and size items, a value corresponding to a backup available area is set. In addition, backup information of the deleted backup data corresponding to the released data 1214*b* is deleted from the backup information stored in the backup information storing unit 173.

Figure 18:
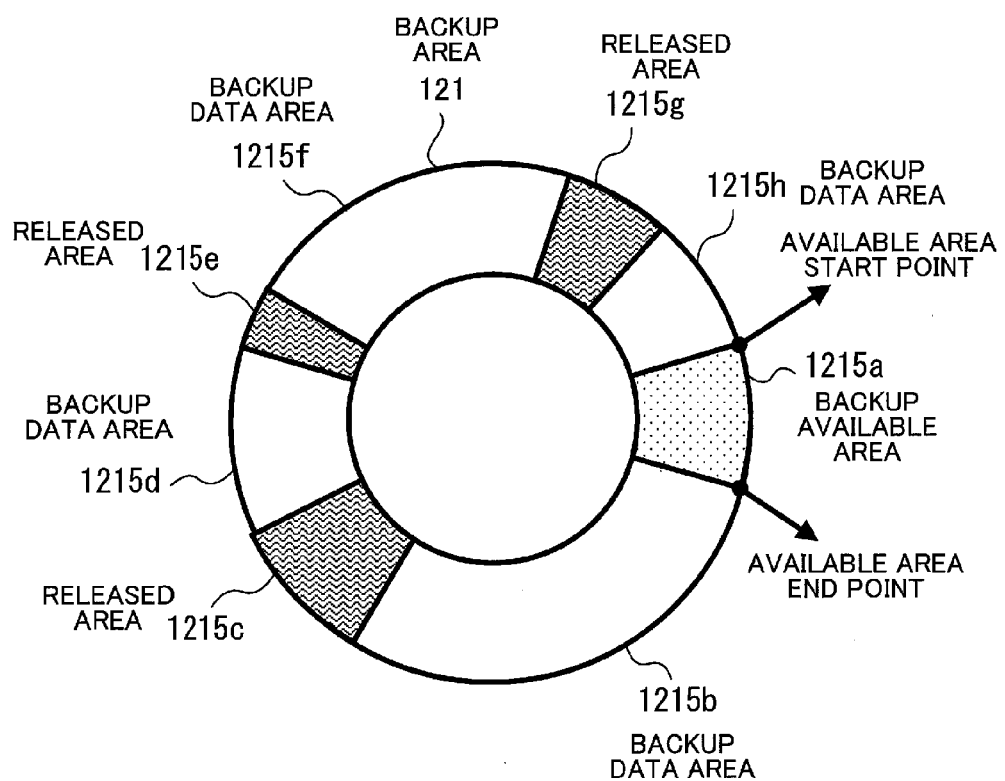
FIG. 18 illustrates area management in the backup area according to the second embodiment.

FIG. 18 illustrates area management in a backup area according to the second embodiment. In the backup area 121 of the second embodiment illustrated in FIG. 18, a backup available area 1215*a*, backup data areas 1215*b*, 1215*d*, 1215*f*, and 1215*h*, and released areas 1215*c*, 1215*e*, and 1215*g* are provided. In the storage apparatus 100 of the second embodiment, the available amount for backup data writing in the backup area 121 is equal to the storage capacity of the backup available area 1215*a*. The storage capacity of the backup available area 1215*a* is defined by a difference between the volume and address of the available area start point and the volume and address of the available area end point. In the storage apparatus 100 of the second embodiment, the backup available area 1215*a* is used as a single continuous storage area, and the released areas 1215*c*, 1215*e*, and 1215*g*, each of which is a discrete free space from the backup available area 1215*a*, are not used for backup data writing. In the case where the size of original data targeted for backup is larger than the storage capacity of the backup available area 1215*a*, backup data of the original data cannot be written to the backup area 121. Here, if each set of backup data has been written and deleted to and from the backup area 121 according to the FIFO principle, the occurrence of the released areas is prevented, which accordingly prevents a reduction in the storage capacity of the backup available area 1215*a*. In addition, when the storage capacity of the backup available area 1215*a* is reduced, for example, when the storage apparatus 100 detects that the backup area 121 is reduced to a predetermined proportion or less, the storage apparatus 100 provides an additional volume to the backup area 121 automatically or by notifying an administrator of the situation. In addition, when the storage capacity of the backup available area 1215*a* increases, for example, when the storage apparatus 100 detects that the backup area 121 increases to a predetermined proportion or more, the storage apparatus 100 deletes a volume from the backup area 121 automatically or by notifying the administrator of the situation.

Figure 19:
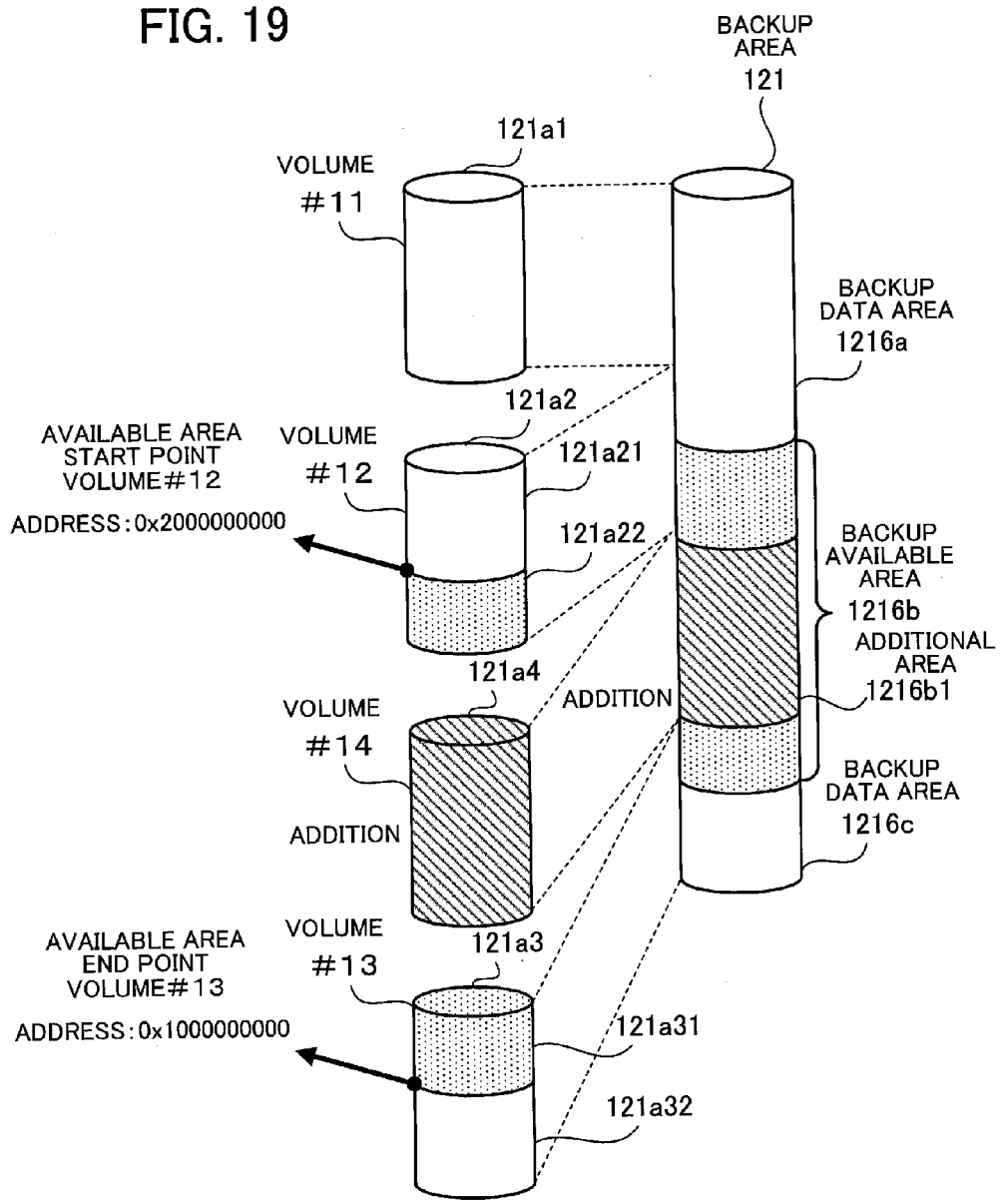
FIG. 19 illustrates a volume addition to the backup area according to the second embodiment.

FIG. 19 illustrates a volume addition to a backup area according to the second embodiment. The storage apparatus 100 of the second embodiment manages the backup area 121 composed of the volume 121*a*1 (Volume #11), the volume 121*a*2 (Volume #12), and the volume 121*a*3 (Volume #13) using the volumes and addresses in the volumes, as described above. Specifically, assume in FIG. 19 that backup data areas 1216*a* and 1216*c* and a backup available area 1216*b* are set in the backup area 121. Note that the backup data areas 1216*a* and 1216*c* are separated into an upper part and a lower part, respectively, in FIG. 19, however, the backup area 121 is in a circular form and the backup data areas 1216*a* and 1216*c* are continuous. Also assume that a value of the available area start point indicates the address of the volume 121*a*2 (Volume #12), 0×2000000000. The storage area 121*a*22 starting from the address of the available area start point in the volume 121*a*2 is a part of the backup available area 1216*b*. The storage area 121*a*21 located before the address of the available area start point in the volume 121*a*2 is a part of the backup data area 1216*a*. Assume further that a value of the available area end point indicates the address of the volume 121*a*3 (Volume #13), 0×1000000000. The storage area 121*a*31 extending up to the address of the available area end point in the volume 121*a*3 is a part of the backup available area 1216*b*. The storage area 121*a*32 starting after the address of the available area end point in the volume 121*a*3 is the backup data area 1216*c*. In addition, the volume 121*a*1 (Volume #11) is a part of the backup data area 1216*a*. Assume here that a volume 121*a*4 (Volume #14) is added to the backup area 121, between the available area start point and the available area end point. With this, the entire storage area of the volume 121a4 becomes a part of the backup available area 1216b as an additional area 1216b1 and, thus, the storage capacity of the backup available area 1216b is increased.

Figure 20:
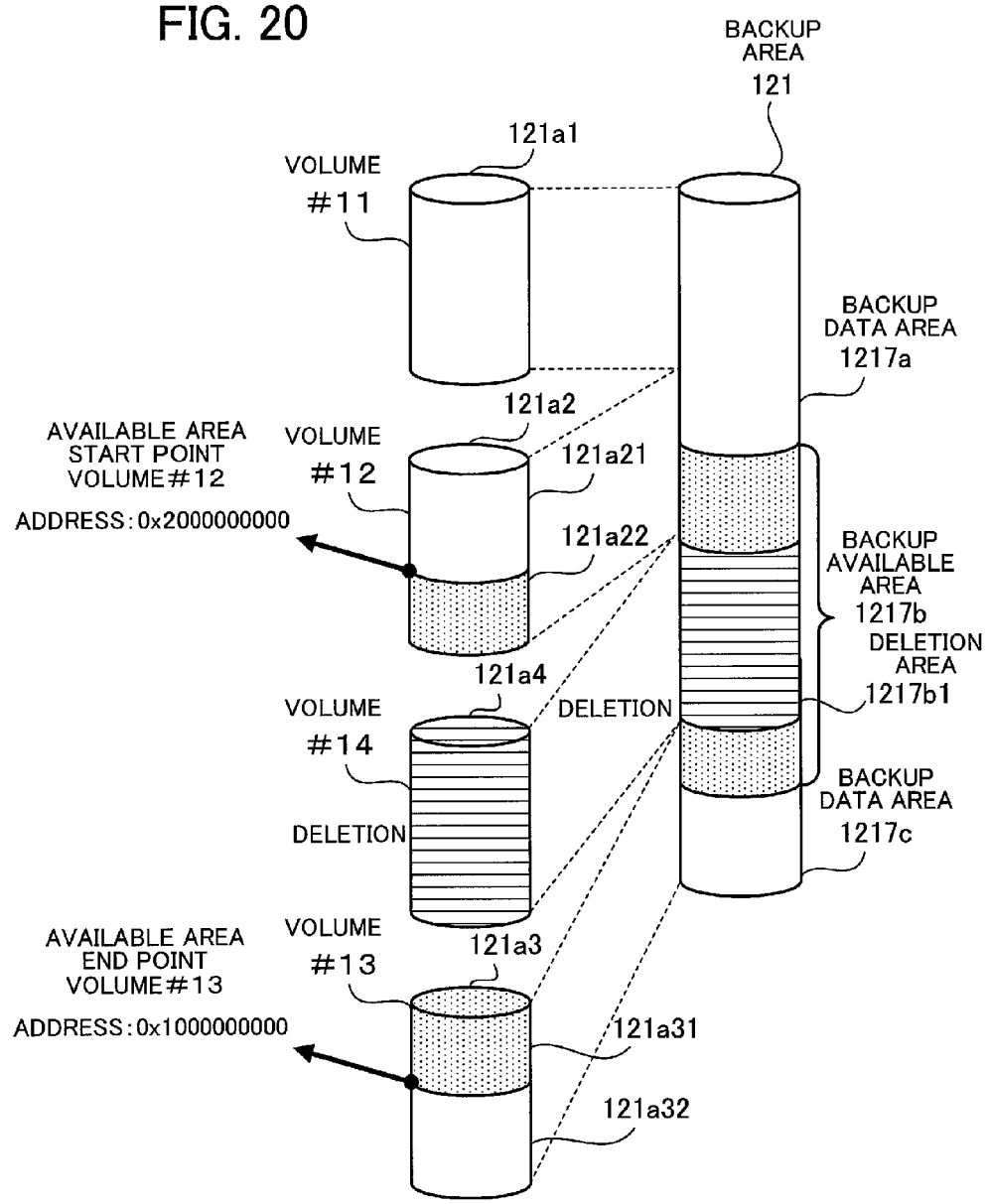
FIG. 20 illustrates volume deletion from the backup area according to the second embodiment.

FIG. 20 illustrates volume deletion from a backup area according to the second embodiment. The storage apparatus 100 of the second embodiment manages the backup area 121 composed of the volume 121a1 (Volume #11), the volume 121a2 (Volume #12), the volume 121a3 (Volume #13), and the volume 121a4 (Volume #14) using the volumes and addresses in the volumes, as described above. Specifically, assume in FIG. 20 that backup data areas 1217a and 1217c and a backup available area 1217b are set in the backup area 121. Note that the backup data areas 1217a and 1217c are separated into an upper part and a lower part, respectively, in FIG. 20, however, the backup area 121 is in a circular form and the backup data areas 1217a and 1217c are continuous. Also assume that a value of the available area start point indicates the address of the volume 121a2 (Volume #12), 0×2000000000. The storage area 121a22 starting from the address of the available area start point in the volume 121a2 is a part of the backup available area 1217b. The storage area 121a21 located before the address of the available area start point in the volume 121a2 is a part of the backup data area 1217a. Assume further that a value of the available area end point indicates the address of the volume 121a3 (Volume #13), 0×1000000000. The storage area 121a31 extending up to the address of the available area end point in the volume 121a3 is a part of the backup available area 1217b. The storage area 121a32 starting after the address of the available area end point in the volume 121a3 is the backup data area 1217c. The volume 121a1 (Volume #11) is a part of the backup data area 1217a. In addition, the volume 121a4 (Volume #14) between the volume of the available area start point and the volume of the available area end point is a part of the backup available area 1217b. Assume here that the backup area 121 has excess storage capacity and, accordingly, a volume is to be reduced. In this case, based on the backup area configuration table 172a stored in the backup area CI storing unit 172, the storage apparatus 100 deletes, from the backup available area 1217b, a volume closest to the available area end point among volumes between the volume of the available area start point and the volume of the available area end point. According to FIG. 20, there is only one volume (i.e., the volume 121a4) between the volume 121a2 of the available area start point and the volume 121a3 of the available area end point and, therefore, the volume 121a4 is deleted from the backup available area 1217b. With this, a deletion area 1217b1, which is the storage area of the volume 121a4, is deleted from the backup available area 1217b and, thus, the storage capacity of the backup available area 1217b is reduced.

Figure 21:
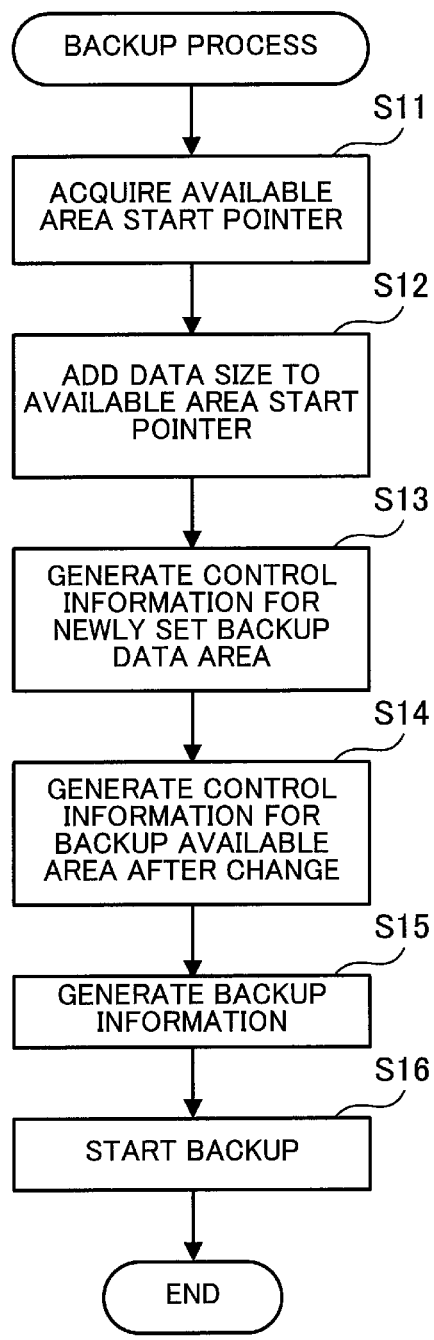
FIG. 21 is a flowchart illustrating a backup process according to the second embodiment.

FIG. 21 is a flowchart illustrating a backup process according to the second embodiment. In the case where, for example, the host computer 300 uses data stored in the storage devices 120a to 120d, with accompanying update, the storage apparatus 100 of the second embodiment backs up the data stored in the storage devices 120a to 120d. At this point, the storage apparatus 100 performs a backup process of writing, to the backup area 121, backup data which is a copy of original data targeted for backup. The backup process of FIG. 21 is described next according to the step numbers in the flowchart.

[Step S11] The pointer control unit 165 acquires a value of the available area start pointer with reference to the available area PI storing unit 171.

[Step S12] The pointer control unit 165 adds the data size of backup data to be written to the backup area 121 to the value of the available area start pointer acquired in Step S11, and sets the obtained value to the available area start pointer of the available area PI storing unit 171. With this, the value of the available area start pointer is changed to indicate a start position after writing of the backup data.

[Step S13] The pointer control unit 165 generates control information for an area newly set as a backup data area when the backup data is written to the backup area 121. The area newly set as a backup data area is located at the top part of the backup available area, and becomes a new backup data area when the backup data is written thereto.

[Step S14] The pointer control unit 165 generates control information for a backup available area after change due to writing of the backup data to the backup area 121. The backup available area after the change is, within the original backup available area, an area other than the area newly set as a backup data area to which the backup data is written, and remains as a backup available area after writing of the backup data.

[Step S15] The backup processing unit 162 generates backup information for the backup data to be written to the new backup data area, and causes the backup information storing unit 173 to store the generated backup information.

[Step S16] The backup processing unit 162 writes the backup data to the new backup data area. At this point, the backup processing unit 162 writes the control information generated in Step S13 in the first block of the new backup data area. With this, the control information is set in the new backup data area. In addition, after writing the backup data, the backup processing unit 162 subsequently writes the control information generated in Step S14 in the next block. With this, the control information is set in the backup available area after change. Subsequently, the process ends.

Figure 22:
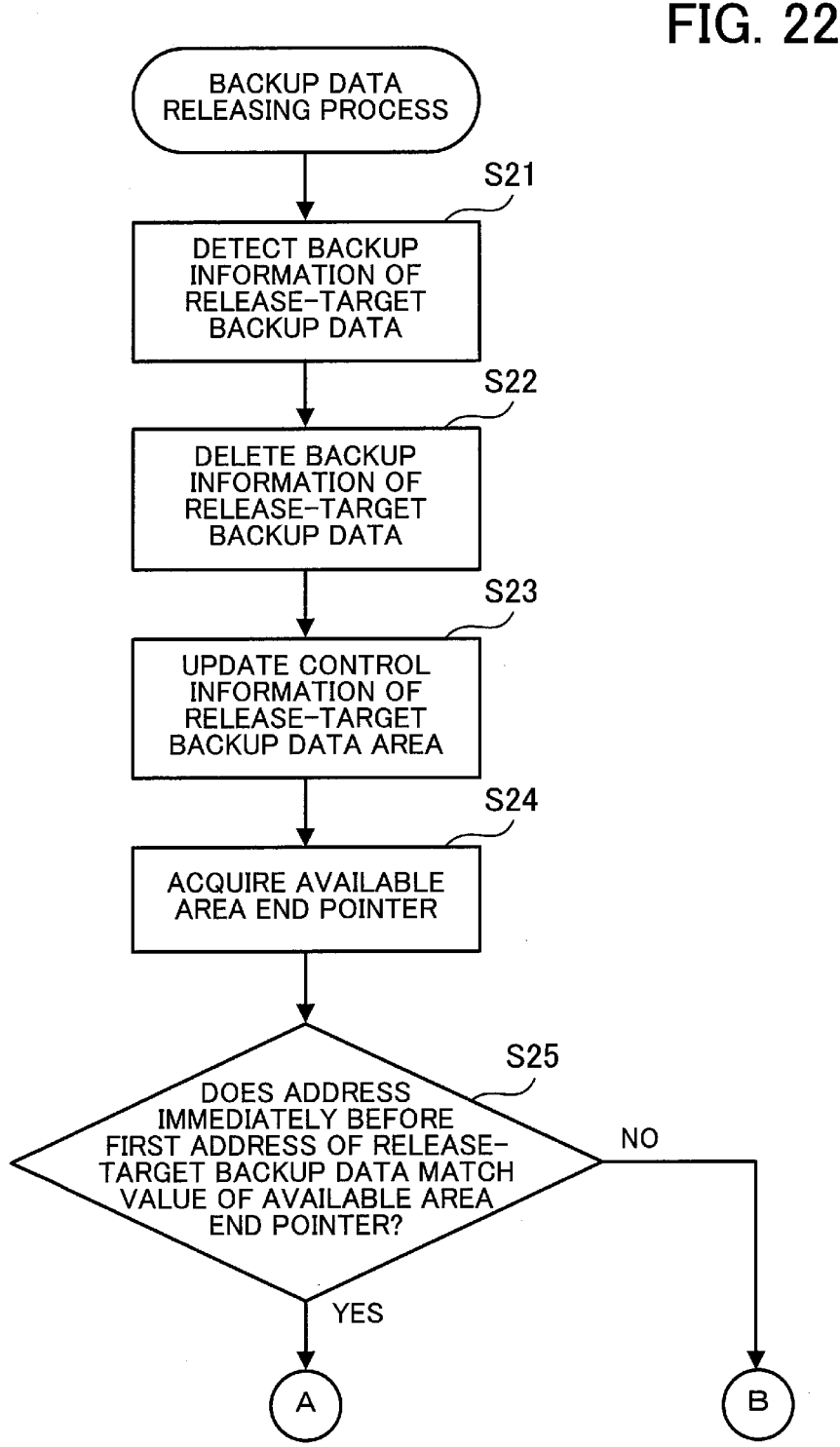
FIG. 22 is a flowchart illustrating a backup data releasing process according to the second embodiment.
Figure 23:
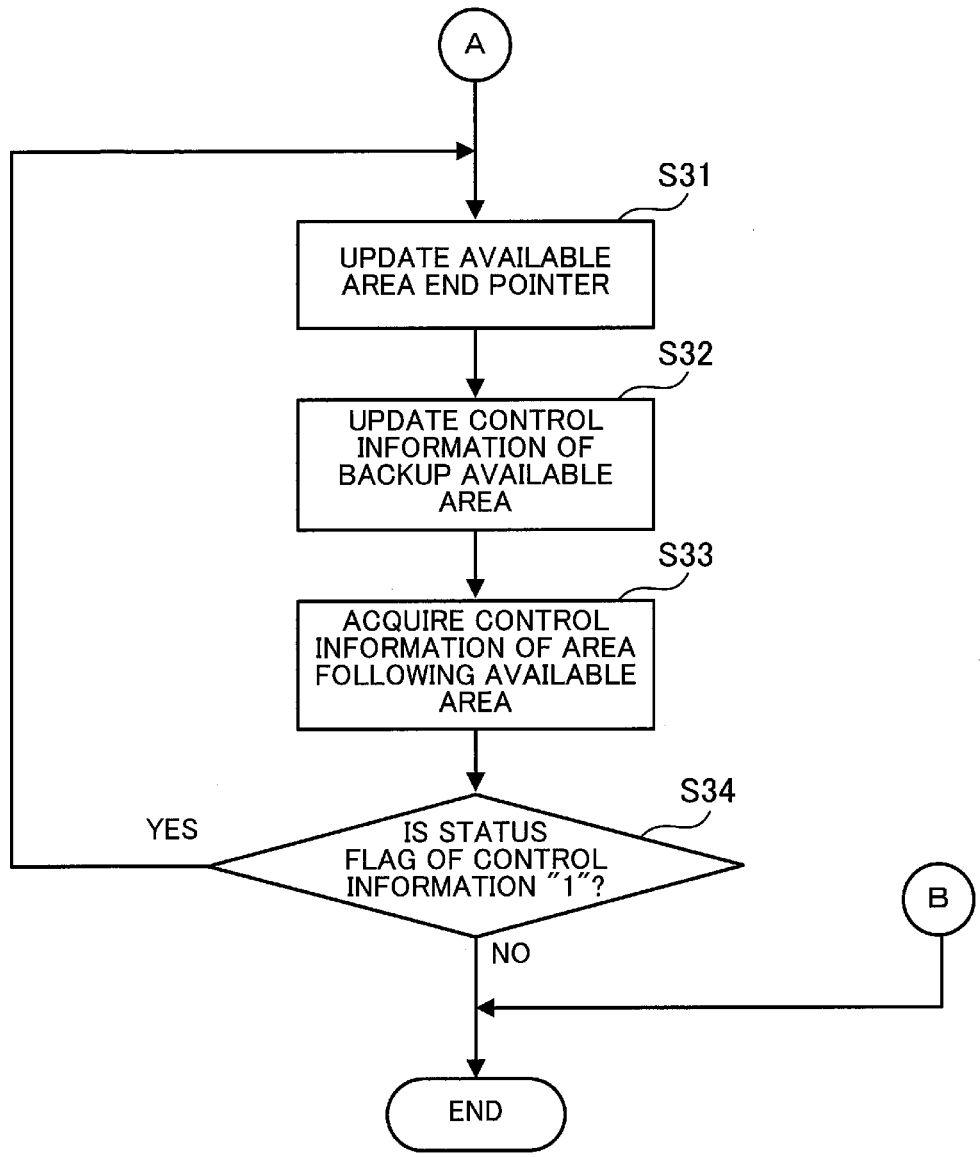
FIG. 23 is another flowchart illustrating the backup data releasing process according to the second embodiment.

FIGS. 22 and 23 are flowcharts illustrating a backup data releasing process according to the second embodiment. In the case where, for example, the host computer 300 finishes the use of the data stored in the storage devices 120a to 120d with accompanying update, the storage apparatus 100 of the second embodiment deletes backup data written to the backup area 121. At this point, the storage apparatus 100 performs a backup data releasing process of releasing, from the backup area 121, a backup data area to which backup data has been written. The backup data releasing process of FIGS. 22 and 23 is described next according to the step numbers in the flowcharts.

[Step S21] The releasing unit 163 detects backup information of backup data to be released ("release-target backup data") by referring to the backup information stored in the backup information storing unit 173. At this time, the releasing unit 163 may detect the release-target backup data according to a file name of the backup data.

[Step S22] The releasing unit 163 deletes the backup information of the release-target backup data detected in Step S21.

[Step S23] The pointer control unit 165 generates control information for a backup data area to be released ("release-target backup data area"). The releasing unit 163 sets the control information generated by the pointer control unit 165 in the first block of the release-target backup data area. With this, the control information of the release-target backup data area is updated.

[Step S24] The pointer control unit 165 acquires a value of the available area end pointer with reference to the available area PI storing unit 171.

[Step S25] The determining unit 164 determines whether one address before the first address of the release-target backup data matches the value of the available area end pointer. In the case where the address matches the value of the available area end pointer (Step S25: Yes), the process is advanced to Step S31 (FIG. 23). On the other hand, if they do not match each other (Step S25: No), the process ends.

[Step S31] The pointer control unit 165 performs an update in which the value of the available area end pointer acquired in Step S24 is set to one address before the next address set in the control information of the release-target backup data. With this, the value of the available area end pointer is changed to indicate the end position of the available area after deletion of the release-target backup data. Accordingly, the release-target backup data area is added to the end of the backup available area after the change.

[Step S32] The pointer control unit 165 generates control information for the backup available area after change due to the deletion of the release-target backup data. The releasing unit 163 sets the control information generated by the pointer control unit 165 in the first block of the backup available area after the change. With this, the control information of the backup available area is updated. Here, the start position of the backup available area remains the same before and after releasing of the backup data. Accordingly, the control information of the backup available area after the change is updated by being written to a block of the control information of the backup available area before the change. In the control information of the backup available area after the change, a value indicating a backup available area (for example, "0") is set in the status flag item. In the next address item, the first address of an area following the release-target backup data area (or, a released area being continuous after releasing) is set. In addition, "0" is set in the size item.

[Step S33] The determining unit 164 acquires control information of an area following the available area updated in Step S31 based on the available area end pointer updated in Step S31.

[Step S34] The determining unit 164 determines whether a value indicating a released area (for example, "1") is set in the status flag item of the control information acquired in Step S33. If the value indicating a released area is set in the status flag item (Step S34: Yes), the process is advanced to Step S31. On the other hand, if the value indicating a release area is not set in the status flag item (Step S34: No), the process ends.

Figure 24:
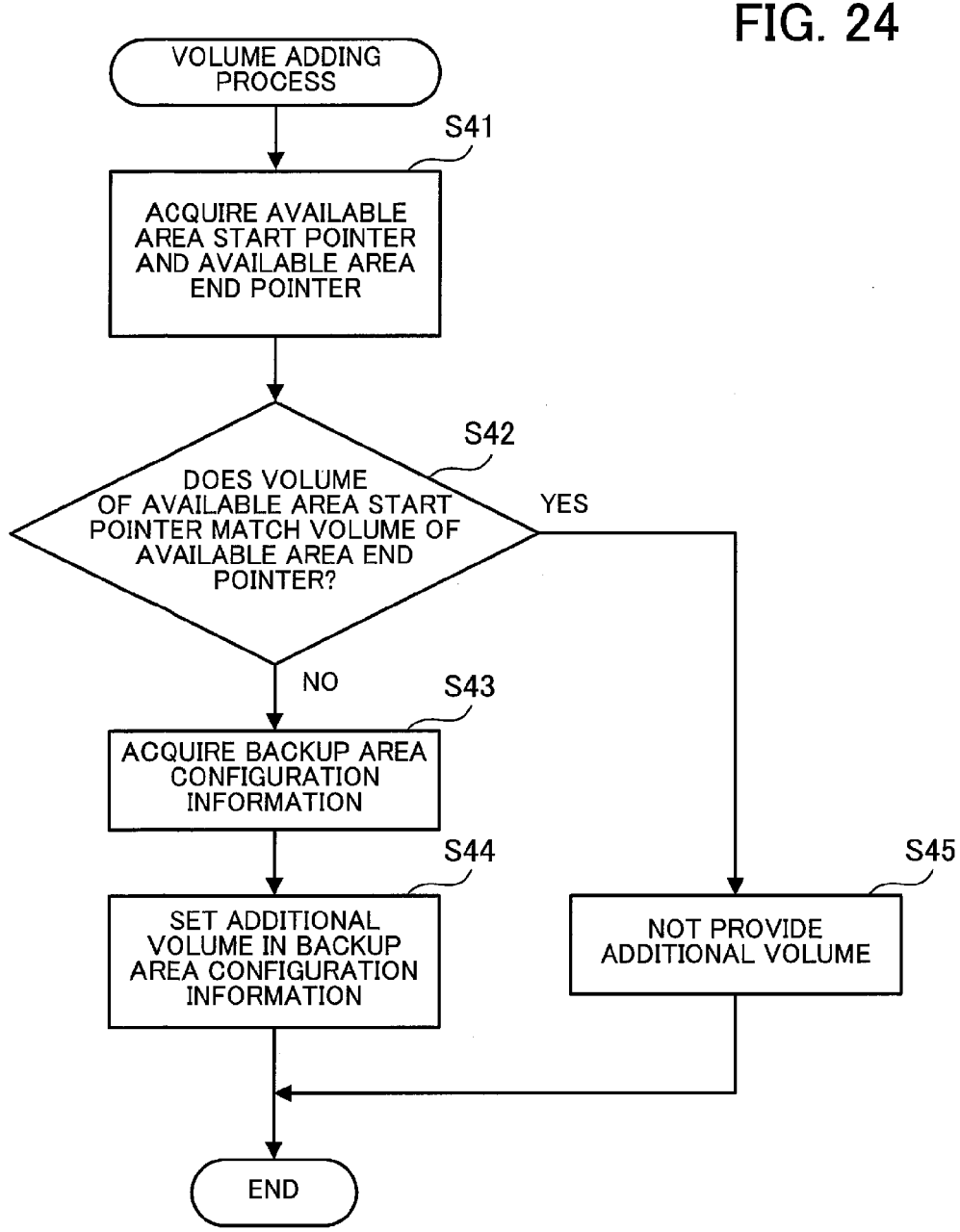
FIG. 24 is a flowchart illustrating a volume adding process according to the second embodiment.

FIG. 24 is a flowchart illustrating a volume adding process according to the second embodiment. The storage apparatus 100 of the second embodiment executes a volume adding process of adding a volume to the backup area 121 to increase the storage capacity of the backup area 121, for example, when the proportion of the backup data area to the backup area 121 (the rate of utilization) exceeds a predetermined proportion (for example, 90%), or when the proportion of the backup available area to the backup area 121 falls below a predetermined proportion (for example, 10%). The volume adding process of FIG. 24 is described next according to the step numbers in the flowchart.

[Step S41] The pointer control unit 165 acquires values of the available area start pointer and the available area end pointer with reference to the available area PI storing unit 171.

[Step S42] Based on the values of the available area start pointer and available area end pointer acquired in Step S41, the additional allocation control unit 166 determines whether the volume of the available area start pointer and the volume of the available area end pointer match each other. If the volume of the available area start pointer and the volume of the available area end pointer match each other (Step S42: Yes), the process is advanced to Step S45. On the other hand, if the volume of the available area start pointer and the volume of the available area end pointer do not match each other (Step S42: No), the process is advanced to Step S43.

[Step S43] The additional allocation control unit 166 acquires backup area configuration information with reference to the backup area CI storing unit 172.

[Step S44] The additional allocation control unit 166 updates the backup area configuration information stored in the backup area CI storing unit 172 in such a manner as to set an additional volume in the backup area configuration information acquired in Step S43. With this, a volume is added to the backup area 121 and, thus, the storage capacity of the backup area 121 is increased. Subsequently, the process ends.

[Step S45] The additional allocation control unit 166 does not allocate an additional volume. In the case where the usage rate of the backup area 121 exceeds a predetermined proportion and the volume of the available area start pointer and the volume of the available area end pointer match each other, i.e., the available area start pointer and the available area end pointer exist in the same volume, the storage apparatus 100 of the second embodiment does not provide an additional volume in the backup area 121. Subsequently, the process ends. Note that the process operation is not limited to this, but the storage apparatus 100 may add, between different volumes in the backup data area of the backup area 121, a volume to be allocated to the backup available area, to thereby increase the storage capacity of the backup area 121. With this, it is possible to give higher priority to an increase in the storage capacity of the backup available area than the continuity of the backup available area.

Figure 25:
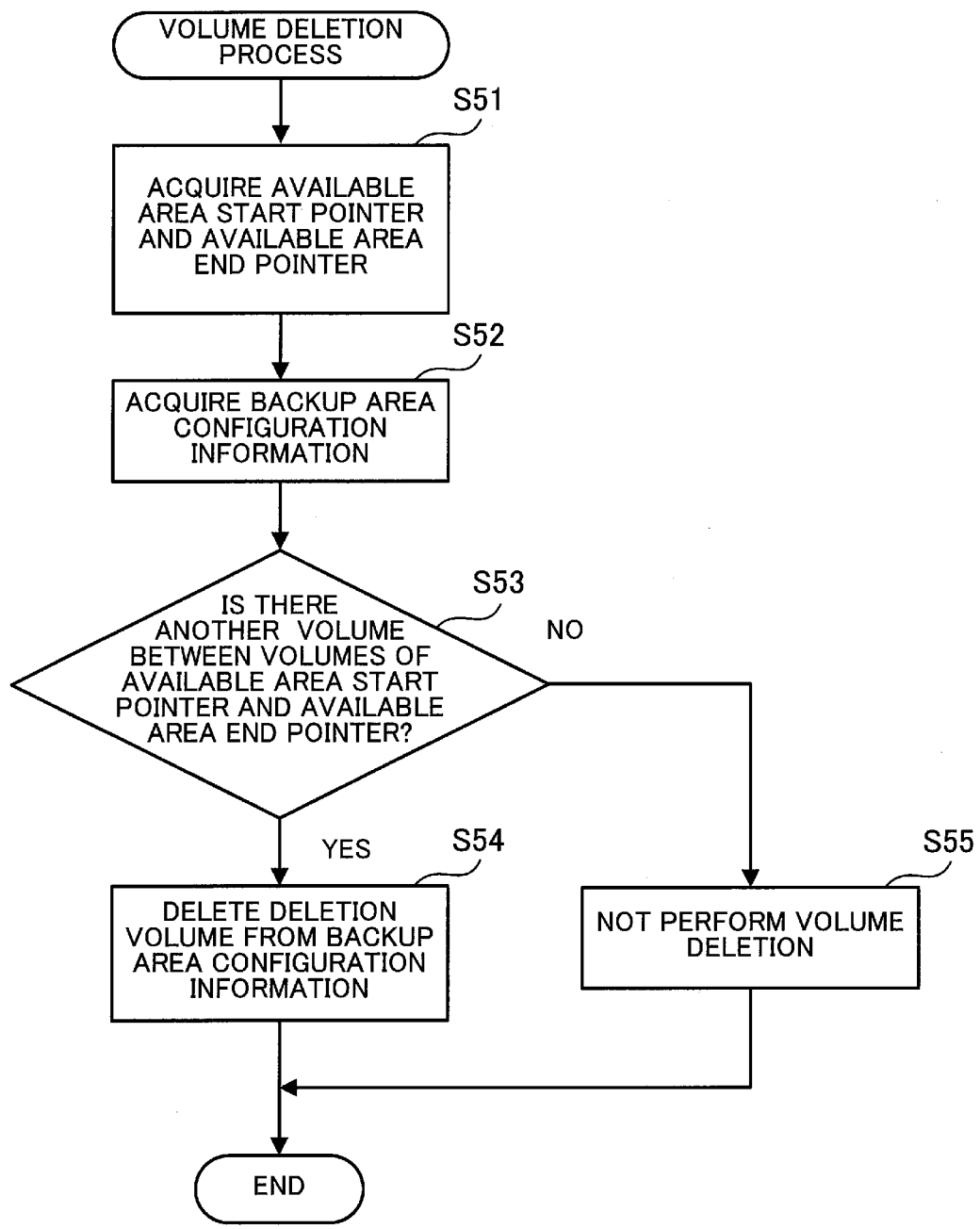
FIG. 25 is a flowchart illustrating a volume deleting process according to the second embodiment.

FIG. 25 is a flowchart illustrating a volume deleting process according to the second embodiment. In the case where, for example, the proportion of the backup data area to the backup area 121 (the rate of utilization) falls below a predetermined proportion (for example, 30%), the storage apparatus 100 of the second embodiment executes a volume deleting process of reducing the storage capacity of the backup area 121 by deleting a volume from the backup area 121 so that the deleted volume is available for other use such as a standby volume. The volume deleting process of FIG. 25 is described next according to the step numbers in the flowchart.

[Step S51] The pointer control unit 165 acquires values of the available area start pointer and the available area end pointer with reference to the available area PI storing unit 171.

[Step S52] The additional allocation control unit 166 acquires the backup area configuration information with reference to the backup area CI storing unit 172.

[Step S53] Based on the values of the available area start pointer and available area end pointer acquired in Step S51 and the backup area configuration information acquired in Step S52, the additional allocation control unit 166 determines whether there is a volume other than the volumes of the available area start pointer and the available area end pointer between the addresses of the available area start pointer and the available area end pointer. If there is another volume (Step S53: Yes), the process is advanced to Step S54. On the other hand, if there is no other volume (Step S53: No), the process is advanced to Step S55.

[Step S54] The additional allocation control unit 166 updates the backup area configuration information stored in the backup area CI storing unit 172 in such a manner as to delete, from the backup area configuration information acquired in Step S52, one of volumes determined in Step S53 to exist between the volumes of the available area start pointer and the available area end pointer. With this, a volume is deleted from the backup available area and, thus, the storage capacity of the backup area 121 is reduced. In the case where there are multiple volumes between the volumes of the available area start pointer and the available area end pointer, a volume other than the volume including the available area end pointer and closest to the available area end pointer is deleted. With this, the volume whose order of being used for backup data writing is late is deleted, which prevents a delay due to an influence of backup processing. Subsequently, the process ends.

[Step S55] The additional allocation control unit 166 does not perform volume deletion. In the case where there is no other volume between the volumes of the available area start pointer and the available area end pointer, it is considered that backup data is included, at least partially, in all volumes. As a result, the storage apparatus 100 of the second embodiment does not perform volume deletion from the backup area 121. Subsequently, the process ends.

The storage apparatus 100 of the second embodiment described above is able to prevent a reduction in the continuity of the backup available area since, at the time of releasing a backup data area, the pointer control unit 165 moves the backup available area end pointer to the end position of the released area. In the case where, for example, the storage capacity of the backup available area is reduced, the additional allocation control unit 166 adds a volume between the address indicated by the available area start pointer and the address indicated by the available area end pointer. This allows the storage capacity of the backup available area to be increased while maintaining the continuity of the backup available area. The backup area managing unit 167 manages the backup area 121 based on the backup area configuration information including volume information for identifying volumes of the storage devices 120a to 120d. This allows the continuity of the backup area to be maintained using the addresses of the volumes, and facilitates the management of the storage area of the volumes. This also facilitates volume addition and deletion with respect to the backup area 121. In the case where a released area is not adjacent to the position indicated by the available area end pointer, the pointer control unit 165 does not move the available area end pointer but sets, in the status flag item of control information of the released area, that the released area has already been released. With this, in the case where, in the backup area 121, a storage area not adjacent to the backup available area is released, the storage area is not set as a backup available area. Accordingly, the continuity of the backup available area is maintained, and it is possible to prevent backup data from being written to a discontinuous area. In the case where the backup area 121 has excess storage capacity, for example, when the usage rate of the backup area 121 falls below a predetermined proportion, the additional allocation control unit 166 deletes, from the backup area 121, one or more volumes whose entire storage area is included in the backup available area. With this, in the case where the backup area 121 has excess storage capacity, it is possible to delete one or more volumes from the backup available area and be converted to other use. The determining unit 164 determines whether, due to a move of the available area end pointer, a released area is adjacent to the position indicated by the available area end pointer. The determining unit 164 determines that, due to a move of the available area end pointer, a released area is adjacent to the position indicated by the available area end pointer, the pointer control unit 165 moves the available area end pointer to the end of the released area. With this, in the case where a backup data area between the backup available area and the released area is released, the released area and the released backup data area become backup available areas. Accordingly, for the released area not adjacent to the backup available area, it is possible to increase the backup available area while maintaining the continuity of the backup available area. In addition, since backup data areas and free space become discontinuous, area addresses and sizes are managed based on each area, which prevents the management of the areas from being complicated and simplifies the management of the backup data and free space.

According to the disclosed storage apparatus, control apparatus, and storage apparatus control method, it is possible to prevent a reduction in the continuity of the area for storing backup data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing is of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus comprising:
one or more storing units; and
a control unit configured to control backup of data to a backup area provided in the storing units,
wherein the control unit includes
a pointer control unit which controls, in the backup area, an available area start pointer indicating a start of an available area that is available for the backup and an available area end pointer indicating an end of the available area,
a backup instruction receiving unit which receives a backup instruction related to control of the backup,
a backup processing unit which performs, when the backup instruction is a backup start instruction instructing a start of the backup, a backup process in which the available area is allocated to backup target data based on the backup start instruction, the allocation of the available area being started from a position indicated by the available area start pointer,
a releasing unit which releases, when the backup instruction is a backup end instruction instructing an end of the backup, an area allocated to backup target data based on the backup end instruction, and
a determining unit which determines whether the released area is adjacent to a position indicated by the available area end pointer, and
when the determining unit determines affirmatively, the pointer control unit moves the available area end pointer to an end of the released area.

2. The storage apparatus according to claim 1, wherein
the control unit further includes an additional allocation control unit which allocates an additional storing unit to the backup area, and
the additional allocation control unit allocates, to the available area between the position indicated by the available area start pointer and the position indicated by the available area end pointer, a storage area added to the backup area due to the additional storing unit.

3. The storage apparatus according to claim 2, wherein
the control unit further includes a backup area managing unit which manages the backup area based on identification information, which is used to identify the storing units, and addresses allocated to storage areas of the storing units.

4. The storage apparatus according to claim 3, wherein when the determining unit determines negatively, the pointer control unit does not update the available area end pointer and sets a status flag in such a manner as to indicate that the released area is already released.

5. The storage apparatus according to claim 2, wherein when a usage rate of the backup area becomes less than or equal to a predetermined rate, the additional allocation control unit deletes, from the backup area, a storing unit whose entire storage area is included in the available area.

6. The storage apparatus according to claim 4, wherein the determining unit determines whether, due to a move of the available area end pointer, the released area whose status flag indicates that the released area is already released is adjacent to the position indicated by the available area end pointer, and when the determining unit determines affirmatively, the pointer control unit moves the available area end pointer to an end of the released area whose status flag indicates that the released area is already released.

7. A control apparatus including
a control unit configured to control backup of data to a backup area provided in one or more storing units of a storage apparatus,
wherein the control unit includes
a pointer control unit which controls, in the backup area, an available area start pointer indicating a start of an available area that is available for the backup and an available area end pointer indicating an end of the available area,
a backup instruction receiving unit which receives a backup instruction related to control of the backup,
a backup processing unit which performs, when the backup instruction is a backup start instruction instructing a start of the backup, a backup process in which the available area is allocated to backup target data based on the backup start instruction, the allocation of the available area being started from a position indicated by the available area start pointer,
a releasing unit which releases, when the backup instruction is a backup end instruction instructing an end of the backup, an area allocated to backup target data based on the backup end instruction, and
a determining unit which determines whether the released area is adjacent to a position indicated by the available area end pointer, and
when the determining unit determines affirmatively, the pointer control unit moves the available area end pointer to an end of the released area.

8. A storage apparatus control method for controlling backup of data to a backup area provided in one or more storing units, the storage apparatus control method comprising:
controlling, by a processor, an available area start pointer indicating a start of an available area that is available in the backup area for the backup and an available area end pointer indicating an end of the available area,
receiving, by the processor, a backup instruction related to control of the backup;
performing, by the processor when the backup instruction is a backup start instruction instructing a start of the backup, a backup process in which the available area is allocated to backup target data based on the backup start instruction, the allocation of the available area being started from a position indicated by the available area start pointer;
releasing, by the processor when the backup instruction is a backup end instruction instructing an end of the backup, an area allocated to backup target data based on the backup end instruction;
determining, by the processor, whether the released area is adjacent to a position indicated by the available area end pointer; and
moving, by the processor, the available area end pointer to an end of the released area, when the released area is determined to be adjacent to the position indicated by the available area end pointer.

* * * * *